United States Patent
Nishio et al.

(10) Patent No.: US 11,553,533 B2
(45) Date of Patent: *Jan. 10, 2023

(54) EFFICIENT TRANSMISSION OF A RESPONSE SIGNAL FOR A RANDOM ACCESS PREAMBLE TRANSMITTED FROM LEGACY OR EXTENSION CARRIER CAPABLE DEVICES

(71) Applicant: Sun Patent Trust, New York, NY (US)

(72) Inventors: Akihiko Nishio, Osaka (JP); Masayuki Hoshino, Kanagawa (JP); Hidetoshi Suzuki, Kanagawa (JP); Takashi Iwai, Ishikawa (JP)

(73) Assignee: Sun Patent Trust, New York, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 17/029,482

(22) Filed: Sep. 23, 2020

(65) Prior Publication Data

US 2021/0007153 A1    Jan. 7, 2021

Related U.S. Application Data

(63) Continuation of application No. 16/514,278, filed on Jul. 17, 2019, now Pat. No. 10,820,354, which is a
(Continued)

(30) Foreign Application Priority Data

Aug. 5, 2011  (JP) .................................. 2011-171945

(51) Int. Cl.
*H04W 74/08* (2009.01)
*H04W 56/00* (2009.01)
(Continued)

(52) U.S. Cl.
CPC ...... *H04W 74/0833* (2013.01); *H04B 7/2671* (2013.01); *H04J 3/0635* (2013.01);
(Continued)

(58) Field of Classification Search
CPC ......... H04W 74/0833; H04W 56/0005; H04W 74/006; H04W 28/0236; H04B 7/2671;
(Continued)

(56) References Cited

U.S. PATENT DOCUMENTS 9,282,577 B2    3/2016  Nishio et al.
2011/0014922 A1  1/2011  Jen
(Continued)

FOREIGN PATENT DOCUMENTS

WO    2013/003980 A1    1/2013

OTHER PUBLICATIONS

3GPP TS 36.211 V10.1.0, "Physical Channels and Modulation (Release 10)," Mar. 2011.
(Continued)

*Primary Examiner* — Justin T Van Roie
(74) *Attorney, Agent, or Firm* — Seed IP Law Group LLP

(57) ABSTRACT

In order to provide a transmission device and transmission method with which a response signal for random access preamble transmitted from a preamble transmission device is efficiently transmitted, setting unit in base station sets a first resource candidate group, which enables terminal capable of receiving a latch response transmitted by demodulation reference signal (DMRS) transmission to be selected, and a second resource candidate group, which enables terminal incapable of receiving a latch response transmitted by DMRS transmission but capable of receiving a latch response transmitted by cell-specific reference signal (CRS) transmission to be selected. Control unit selects DMRS transmission as the latch response transmission
(Continued)

method when a resource in which latch preamble has been received is included in the first candidate group, but selects CRS transmission as the latch response transmission method when the resource is included in the second resource candidate group.

8 Claims, 14 Drawing Sheets

Related U.S. Application Data continuation of application No. 15/705,081, filed on Sep. 14, 2017, now Pat. No. 10,405,352, which is a continuation of application No. 15/004,524, filed on Jan. 22, 2016, now Pat. No. 9,801,210, which is a continuation of application No. 14/237,252, filed as application No. PCT/JP2012/004617 on Jul. 20, 2012, now Pat. No. 9,282,577.

(51) Int. Cl.
  *H04J 3/06* (2006.01)
  *H04J 11/00* (2006.01)
  *H04B 7/26* (2006.01)
  *H04W 74/00* (2009.01)
  *H04W 28/02* (2009.01)

(52) U.S. Cl.
  CPC ..... *H04J 11/0079* (2013.01); *H04W 56/0005* (2013.01); *H04W 74/006* (2013.01); *H04J 2011/0096* (2013.01); *H04W 28/0236* (2013.01)

(58) Field of Classification Search
  CPC ................. H04J 3/0635; H04J 11/0079; H04J 2011/0096
  See application file for complete search history.

(56) References Cited

U.S. PATENT DOCUMENTS

| | | |
|---|---|---|
| 2011/0281576 A1 | 11/2011 | Sato et al. |
| 2013/0064216 A1 | 3/2013 | Gao et al. |
| 2013/0242730 A1 | 9/2013 | Pelletier et al. |
| 2013/0301608 A1 | 11/2013 | Frenne et al. |
| 2013/0329625 A1 | 12/2013 | Lee et al. |
| 2014/0112254 A1 | 4/2014 | Lindoff et al. |
| 2014/0376486 A1 | 12/2014 | Lee et al. |
| 2016/0329625 A1 | 11/2016 | Lin |

OTHER PUBLICATIONS

3GPP TS 36.212 V10.1.0, "Multiplexing and channel coding (Release 10)," Mar. 2011.
3GPP TS 36.213 V10.1.0, "3rd Generation Partnership Project; Technical Specification Group Radio Access Network; Evolved Universal Terrestrial Radio Access (E-UTRA); Physical layer procedures (Release 10)," Mar. 2011, 115 pages.
3GPP TS 36.213 V10.2.0, "Physical layer procedures (Release 10)," Jun. 2011.
3GPP TS 36.321 V10.1.0, "3rd Generation Partnership Project; Technical Specification Group Radio Access Network; Evolved Universal Terrestrial Radio Access (E-UTRA); Medium Access Control (MAC) protocol specification (Release 10)," Mar. 2011, 53 pages.
3GPP TSG RAN WG1 meeting #64, R1-110649, Feb. 2011, Aspect on Distributed RRUs with Shared Cell-ID for Heterogeneous Deployments, Taipei, Taiwan.
3GPP TSG RAN WG1 meeting # 59bis, R1-100359, Jan. 2010, Possible definition of extension carrier and carrier segment, Valencia, Spain.
3GPP TSG RAN WG1 meeting #65, R1-111716, May 2011, RA Response in MBSFN subframes, Barcelona, Spain.
3GPP TSG RAN WG1 meeting #60bis, R1-102042, Apr. 2010, R-PDCCH placement, Beijing, China.
ETSI TS 136.321 V10.1.0, "Medium Access Control (MAC) Protocol specification, (Release 10)," Apr. 2011.
International Search Report, dated Oct. 16, 2012, for corresponding Application No. PCT/JP2012/004617. (With English Translation).
Lindoff et al., "Random Access Procedures and Apparatus for Heterogeneous Networks," U.S. Appl. No. 61/498,357, filed Jun. 2011.
LTE—The UMTS Long Term Evolution, Section 19, John Wiley & Sons Ltd., Apr. 2009.
Gao et al., "Enhanced PDCCH With Transmit Diversity in LTE Systems," U.S. Appl. No. 61/644,089, filed May 8, 2012.
Pelletier, "Partitioning of PRACH Resources in a Wireless Communication Sysiem," U.S. Appl. No. 61/644,562, filed May 9, 2012.

| Rel. | Path loss | RACH resource | |
|---|---|---|---|
| Rel. 8 to 10 | $PL \geq Th_p$ | GROUP 2A | FOR CRS-BASED RACH procedure |
| | $PL < Th_p$ | GROUP 2B | |
| Rel. 11 | $PL \geq Th_p$ | GROUP 1A | FOR DMRS-BASED RACH procedure |
| | $PL < Th_p$ | GROUP 1B | |

FIG. 7

| Rel. | Path loss | RACH resource | |
|---|---|---|---|
| Rel. 8 to 11 | $PL \geq Th_p$ | GROUP 2A | FOR CRS-BASED RACH procedure |
| Rel. 8 to 10 | $PL < Th_p$ | GROUP 2B | |
| Rel. 11 | $PL < Th_p$ | GROUP 1 | FOR DMRS-BASED RACH procedure |

FIG. 8

EFFICIENT TRANSMISSION OF A RESPONSE SIGNAL FOR A RANDOM ACCESS PREAMBLE TRANSMITTED FROM LEGACY OR EXTENSION CARRIER CAPABLE DEVICES

BACKGROUND

Technical Field

The present disclosure relates to a transmission apparatus, a preamble transmission apparatus and a transmission method.

Description of the Related Art

In Release 8 (Rel. 8) of 3GPP-LTE (3rd Generation Partnership Project Radio Access Network Long Term Evolution) (hereinafter may be simply referred to as "LTE"), OFDMA (orthogonal frequency division multiple access) is employed as a downlink communication method, and SC-FDMA (single carrier frequency division multiple access) is employed as an uplink communication method.

In the Rel. 8 downlink, in order to demodulate a data signal (for example, a signal transmitted via a PDSCH), a CRS (cell specific reference signal) is used. In other words, the Rel. 8 downlink supports "CRS-used data transmission." "CRS-used data transmission" refers to a transmission method in which a data signal is transmitted together with a CRS in a subframe with the CRS mapped therein, and during data reception, a terminal estimates a propagation channel according to the CRS and demodulates the data. A CRS is a reference signal to be transmitted over a full band in all subframes and is common within a given cell. Also, CRSs are mapped to time and frequency resources that depend on a cell ID, and for the CRSs, antenna ports 0 to 3 are used according to the number of transmission antennae. Also, CRSs are transmitted so as to cover all areas in a given cell. CRSs are also used for quality measurement, and results of the quality measurement are used for link adaptation or scheduling.

Meanwhile, Rel. 10, which is LTE-Advanced, supports "DMRS (demodulation reference signal)-used data transmission" in order to apply MIMO (multi-input multi-output) to downlink. "DMRS-used data transmission" refers to a transmission method in which a data signal is transmitted together with a DMRS in a subframe with a DMRS mapped therein, and during data reception, a terminal estimates a propagation channel according to the DMRS to demodulate the data. DMRS may be called "UE specific reference signal." Also, while CRSs are transmitted to an entire cell, DMRSs are transmitted to a terminal to which a data resource for mapping a downlink data signal has been allocated, and transmitted only in a resource block (that is, a frequency resource) to which the data for the terminal has been allocated. When a data signal is transmitted to a predetermined terminal, a beam is formed by precoding, enabling data communication using the beam. Data communication using such beam provides a high throughput (see, for example, NPLs 1, 2, 3 and 4). Also, DMRS-used data transmission can be used for a terminal for which transmission mode 9 has been set. Also, antenna ports 7 to 14 are used according to the number of transmission antennae. Also, in Rel. 10, which is LTE-Advanced, CSI-RSs are used for quality measurement, and results of the quality measurement are used for link adaptation or scheduling.

Also, in Rel. 10, which is LTE-Advanced, a terminal for which transmission mode 9 has been set can also transmit a data signal in an "MBSFN (multi-broadcast single frequency network) subframe."

Meanwhile, in Rel. 8, an "MBSFN subframe" is used for transmitting MBMS data (multicast or broadcast data) from a plurality of base stations to an SFN (single frequency network). Thus, resources in which a PDCCH signal and a CRS are mapped are limited to first two OFDM symbols in a subframe. Then, only MBMS data can be mapped in a third OFDM symbol from the head of the subframe and OFDM symbols subsequent to the third OFDM symbol. In other words, an MBSFN subframe contains no CRS in a third OFDM symbol from the head of the subframe or OFDM symbols subsequent to the third OFDM symbol (that is, data transmission region).

On the other hand, in Rel. 10, which is LTE-Advanced, DMRS-used data transmission (unicast data transmission) can be performed also in MBSFN subframes. As described above, an MBSFN subframe contains no CRS in the third OFDM symbol from the head of a subframe or OFDM symbols subsequent to the third OFDM symbol (that is, data transmission region), and thus, in Rel. 10, which is LTE-Advanced, more time and frequency resources can be used for PDSCH.

Also, for Rel. 11 (release following Rel. 10), which is LTE-Advanced, CoMP transmission, which provides coordinated transmission from a plurality of nodes, is being studied. Also, in the case where the CoMP transmission is used in a heterogeneous network environment, an operation using a cell ID that is the same as that of an HPN for a plurality of LPNs in a macro cell is being discussed (see, for example, NPL 6). In such operation, a common CRS is transmitted from an HPN and LPNs using a same cell ID. The term "heterogeneous network environment" refers to a network environment including a macro base station (HPN (high power node)) and pico base stations (LPN (low power nodes)).

Furthermore, an extension carrier (non-backward compatible carrier) for downlink is being studied for Rel. 11, which is LTE-Advanced. The extension carrier supports only DMRS, and no CRS is transmitted for overhead reduction (see, for example, NPL 7). As described above, the extension carrier enables highly efficient transmission by the operation that supports DMRS-used data transmission only.

Also, in LTE and LTE-Advanced, a terminal transmits an RACH (random access channel) to a base station when initial access is made, uplink data is generated during connection, or a handover is performed. Consequently, an attempt to establish connection from the terminal to the base station or to establish re-synchronization therebetween is made. A series of operations for the connection from the terminal to the base station or the establishment of re-synchronization therebetween is called "random access procedure." "Random access procedure" includes the four steps indicated in FIG. 1 (see, for example, NPL 5).

Step 1 (transmission of message 1): A terminal randomly selects an RACH preamble resource to be actually used from a group of RACH preamble resource candidates (prescribed by combinations of time resources, frequency resources and sequence resources). Then, the terminal transmits an RACH preamble using the selected RACH preamble resource. Here, the selectable RACH preamble resource candidates are different depending on whether a propagation loss (path loss) between a base station and the terminal is not less than a predetermined threshold or is not greater than the predetermined threshold. The selectable RACH preamble resource candidates are also different depending on whether the data size is not less than a predetermined threshold or is not greater than the predetermined threshold. Also, an RACH preamble may be called "message 1."

Step 2 (transmission of message 2): when a base station detects the RACH preamble, the base station transmits an RACH response (or a random access response). At this point of time, the base station cannot identify the terminal that has transmitted the RACH preamble. Thus, the RACH response is transmitted over the entire cell covered by the base station. A data resource in which the RACH response is mapped (that is, a PDSCH resource) is indicated by the base station to the terminal via a PDCCH. Also, the RACH response contains information relating to a resource to be used by the terminal in uplink or information relating to uplink transmission timing for the terminal. Here, if the terminal that has transmitted the RACH preamble receives no RACH response within a predetermined period of time from the transmission of the RACH preamble (that is, a retransmission determination period), the terminal performs RACH preamble resource selection and RACH preamble transmission (RACH retransmission) again.

Step 3 (transmission of message 3): the terminal transmits data such as an RRC connection request or a scheduling request using the uplink resource specified by the base station via the RACH response.

Step 4 (transmission of message 4): The base station transmits a message containing a UE-ID (for example, C-RNTI or temporary C-RNTI) assigned to the terminal, to the terminal to confirm that there is no contention between a plurality of terminals (contention resolution).

CITATION LIST

Non-Patent Literature

| | |
|---|---|
| NP L 1 | 3GPP TS 36.211 V10.1.0, "Physical Channels and Modulation (Release 10)," March 2011 |
| NP L 2 | 3GPP TS 36.212 V10.1.0, "Multiplexing and channel coding (Release 10)," March 2011 |
| NP L 3 | 3GPP TS 36.213 V10.1.0, "Physical layer procedures (Release 10)," March 2011 |
| NP L 4 | 3GPP TS 36.321 V10.1.0, "Medium Access Control Protocol specification, (Release 10)" March 2011 |
| NP L 5 | "LTE—THE UNITS LONG TERM EVOLUTION," Section 19, John Wiley & Sons Ltd, April 2009 |
| NP L 6 | 3GPP TSG RAN WG1 meeting, R1-110649, February 2011 |
| NP L 7 | 3GPP TSG RAN WG1 meeting, R1-100359, January 2010 |
| NP L 8 | 3GPP TSG RAN WG1 meeting, R1-111716, May 2011 |

BRIEF SUMMARY

Technical Problem

As described above, the LTE-Advanced system provides highly efficient transmission by DMRS-used data transmission in MBSFN subframes and extension carriers, and CoMP transmission using a same cell ID.

However, "random access procedure" has the following problems.

(1) Problems relating to MBSFN subframe:

In one frame (=ten subframes), subframes with subframe numbers other than 0, 4, 5 and 9 can be set as MBSFN subframes. In other words, subframes with subframe numbers of 1, 2, 3, 6, 7 and 8 are set as MBSFN subframes, enabling highly efficient system operation.

Here, in a non-MBSFN subframe, a CRS is mapped over the entire subframe, an RACH response can be transmitted by "CRS-used data transmission." In other words, in a non-MBSFN subframe, even if an RACH response is transmitted by "CRS-used data transmission," the terminal can receive the downlink data signal at a sufficiently low error rate.

On the other hand, in an MBSFN subframe, a CRS is mapped to only two OFDM symbols from the head of the subframe. Thus, with the MBSFN subframe, an error rate in RACH response reception increases.

Here, as described above, a terminal that supports Rel. 10, which is LTE-Advanced, can receive a DMRS. Thus, in Rel. 10, which is LTE-Advanced, an RACH response may be transmitted in an MBSFN subframe (see, for example, NPL 8).

However, if an RACH response is transmitted by "DMRS-used data transmission," a release 10 compliant terminal can receive the RACH response, but a release 8 compliant terminal does not support DMRS and thus cannot receive the RACH response. Thus, even though the base station transmits an RACH response in an MBSFN subframe to a terminal that is the transmission source of the RACH preamble, if the transmission source terminal is a release 8 compliant terminal, the RACH response is not correctly received. Accordingly, the transmission source terminal retransmits the RACH preamble. Thus, transmission of an RACH response by "DMRS-used data transmission" causes delay for release 8 compliant terminals. For this reason, in Rel. 10, an RACH response is transmitted using a CRS, and subframes in which an RACH response may be transmitted are limited to non-MBSFN subframes (see FIG. 2). However, limiting subframes used for transmission of an RACH response to non-MBSFN subframes results in delay of RACH response transmission. Also, shared channel signals to be transmitted by "CRS-used data transmission," concentrate in non-MBSFN subframes. For this reason, a PDCCH region (that is, a common search space) used for indicating resources for mapping shared channel signals is congested. A shared channel signal that needs to be transmitted by "CRS-used data transmission" contains, e.g., an SIB (system information block), which is broadcast information, or paging information.

(2) Problems relating to extension carrier:

Provision of extension carriers enables an increase in capacity of resources. However, the extension carriers cannot be used for release 8 or release 10 compliant terminals. Thus, in transmission using a PDSCH during an RACH procedure, it is necessary to use normal component carriers. For this reason, normal component carriers are congested, which may result in delay in initial access or handover.

(3) Problems relating to CoMP transmission using same cell ID:

A common CRS is transmitted from all HPN and LPNs using the same cell ID. Thus, when CRS-used data transmission (that is, transmission of a PDSCH), the PDSCH is also transmitted from all transmission points (that is, all the HPN and the LPNs using the same cell ID). Accordingly, if data transmission using a CRS is employed for data transmission using a PDSCH during an RACH procedure, even for data transmission to a terminal located in the vicinity of a certain transmission point, the data is inefficiently transmitted from all the transmission points.

An object of the present disclosure to provide a transmission apparatus, a preamble transmission apparatus and a transmission method that achieve efficient response signal transmission.

Solution to Problem

A transmission apparatus according to an aspect of the present disclosure is a transmission apparatus configured to receive a random access preamble transmitted from a preamble transmission apparatus and to transmit a response signal for the received random access preamble to the preamble transmission apparatus, the transmission apparatus including: a transmission section that transmits a first reference signal via a first antenna port and transmits a second reference signal via a second antenna port; a setting section that sets a first resource group selectable by a first preamble transmission apparatus allowed to receive the response signal transmitted via the first antenna port and the response signal transmitted via the second antenna port, and a second resource group selectable by a second preamble transmission apparatus not allowed to receive the response signal transmitted via the first antenna port but allowed to receive the response signal transmitted via the second antenna port; and a reception section that receives the random access preamble transmitted using a resource included in the first resource group or the second resource group, in which the transmission section transmits the response signal via the first antenna port or the second antenna port when the resource used for the random access preamble is included in the first resource group, and the transmission section transmits the response signal via the second antenna port when the resource used for the random access preamble is included in the second resource group.

A transmission apparatus according to an aspect of the present disclosure is a transmission apparatus configured to receive a random access preamble transmitted from a preamble transmission apparatus and to transmit a response signal for the received random access preamble to the preamble transmission apparatus, the transmission apparatus including: a transmission section that transmits a first reference signal via a first antenna port and transmits a second reference signal via a second antenna port; a setting section that sets a first resource group used for transmitting the response signal for the random access preamble via any one of the first antenna port and the second antenna port, and a second resource group used for transmitting the response signal for the random access preamble via the second antenna port; and a reception section that receives the random access preamble transmitted using a resource included in the first resource group or the second resource group, in which the transmission section transmits the response signal via the first antenna port or the second antenna port when the resource used for the random access preamble is included in the first resource group, and the transmission section transmits the response signal via the second antenna port when the resource used for the random access preamble is included in the second resource group.

A preamble transmission apparatus according to an aspect of the present disclosure is a preamble transmission apparatus configured to transmit a random access preamble and to receive a response signal for the random access preamble, the preamble transmission apparatus including: a reception section that receives a first reference signal transmitted via a first antenna port or a second reference signal transmitted via a second antenna port; a selection section that selects a first resource group in which the response signal for the random access preamble is transmitted via any one of the first antenna port and the second antenna port, or a second resource group in which the response signal for the random access preamble is transmitted via the second antenna port; and a transmission section that transmits the random access preamble using a resource included in the selected first or second resource group, in which the reception section receives the response signal transmitted via the first antenna port or the second antenna port when the resource used for the random access preamble is included in the first resource group, and the reception section receives the response signal transmitted via the second antenna port when the resource used for the random access preamble is included in the second resource group.

A transmission method according to an aspect of the present disclosure is a transmission method for receiving a random access preamble transmitted from a preamble transmission apparatus and transmitting a response signal for the received random access preamble to the preamble transmission apparatus, the transmission method including: transmitting a first reference signal via a first antenna port; transmitting a second reference signal via a second antenna port; setting a first resource group selectable by a first preamble transmission apparatus allowed to receive the response signal transmitted via the first antenna port and the response signal transmitted via the second antenna port, and a second resource group selectable by a second preamble transmission apparatus not allowed to receive the response signal transmitted via the first antenna port but allowed to receive the response signal transmitted via the second antenna port; and receiving the random access preamble transmitted using a resource included in the first resource group or the second resource group, in which: the response signal is transmitted via the first antenna port or the second antenna port when the resource used for the random access preamble is included in the first resource group; and the response signal is transmitted via the second antenna port when the resource used for the random access preamble is included in the second resource group.

Advantageous Effects of Disclosure

The present disclosure enables provision of a transmission apparatus, a preamble transmission apparatus and a transmission method that achieve efficient transmission of a response signal for a random access preamble transmitted from a preamble transmission apparatus.

BRIEF DESCRIPTION OF THE SEVERAL VIEWS OF THE DRAWINGS

FIG. 7 is a diagram illustrating a first example of a transmission method determination table according to Embodiment 3 of the present disclosure;

FIG. 8 is a diagram illustrating a second example of a transmission method determination table according to Embodiment 3 of the present disclosure;

DETAILED DESCRIPTION

Figure 1:
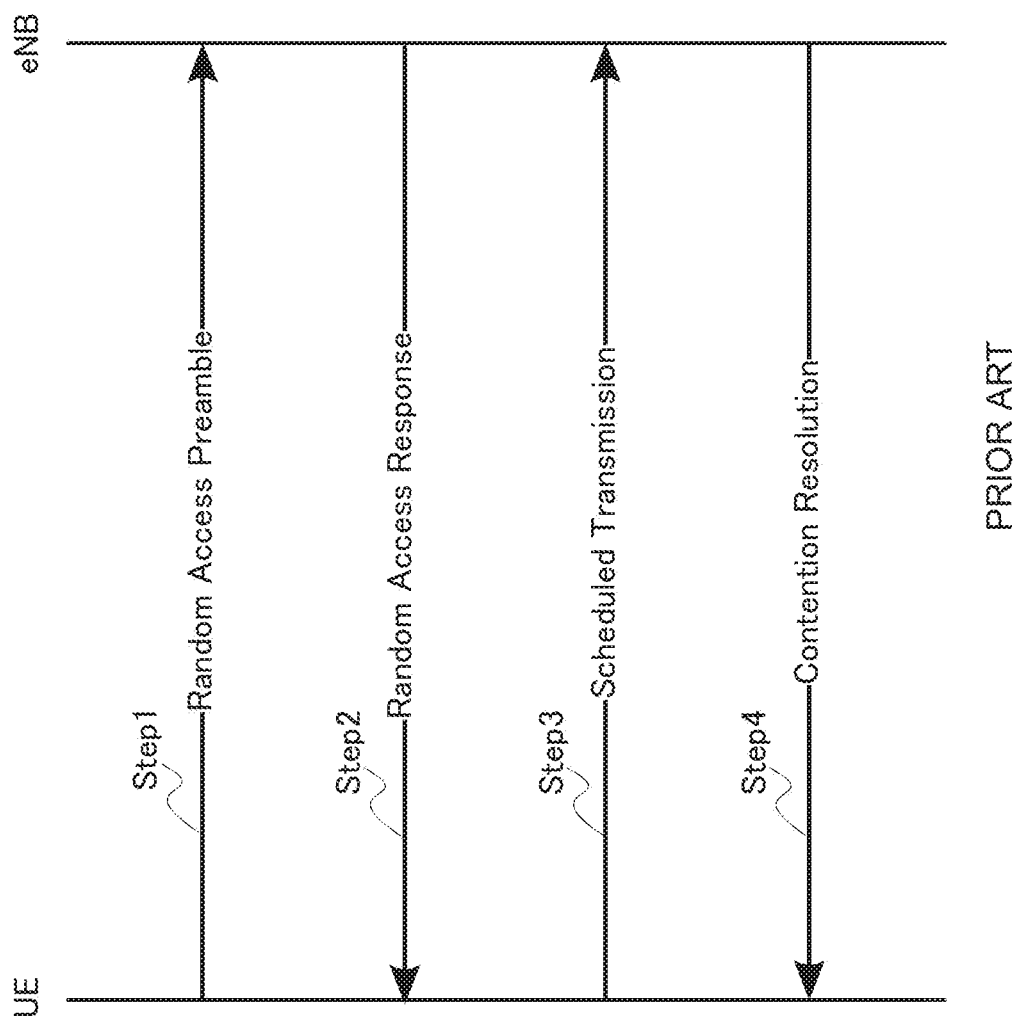
FIG. 1 is a diagram provided for description of a random access procedure.

Embodiments of the present disclosure will be described in detail below with reference to the accompanying drawings. In the embodiments, same components are provided with same reference numerals and a description thereof will not be repeated to avoid overlap.

Embodiment 1

Overview of Communication System

A communication system according to Embodiment 1 of the present disclosure includes a transmission apparatus that transmits a response signal for a random access preamble, a first preamble transmission apparatus and a second preamble transmission apparatus that each transmits a random access preamble.

Figure 3:
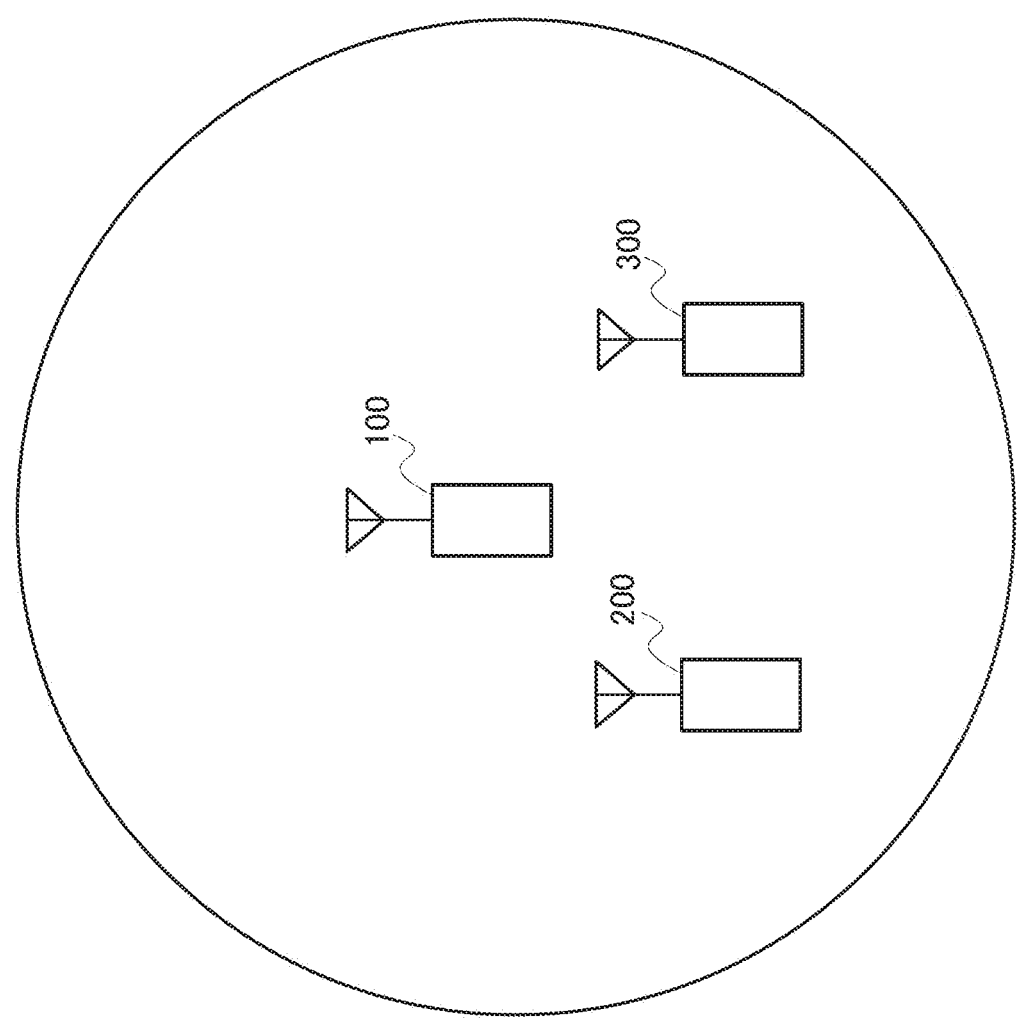
FIG. 3 is a diagram illustrating an example of a communication system according to Embodiment 1 of the present disclosure.

FIG. 3 is a diagram illustrating an example of the communication system according to Embodiment 1 of the present disclosure. In FIG. 3, the communication system according to Embodiment 1 of the present disclosure includes base station 100 and terminals 200 and 300. In FIG. 3, the response signal transmission apparatus corresponds to base station 100, and the first and the second preamble transmission apparatuses correspond to terminals 200 and 300, respectively. Base station 100 receives random access preambles transmitted from terminals 200 and 300 and transmits response signals for the received random access preambles to terminals 200 and 300. While terminal 200 can receive a first reference signal and a second reference signal, terminal 300 cannot receive a first reference signal but can receive a second reference signal.

More specifically, in base station 100, transmission section 104 to be described hereinafter transmits a first reference signal via a first antenna port, and transmits a second reference signal via a second antenna port. Setting section 101 to be described hereinafter sets a first resource group that can be selected by the first preamble transmission apparatus that can receive a response signal transmitted via the first antenna port and a response signal transmitted via a second antenna port, and a second resource group that can be selected by the second preamble transmission apparatus that cannot receive a response signal transmitted via the first antenna port but can receive a response signal transmitted via the second antenna port. Reception section 102 to be described hereinafter receives a random access preamble transmitted using a resource included in the first resource group or the second resource group. Then, when the resource for the random access preamble is included in the first resource group, transmission section 104 to be described hereinafter transmits a response signal via the first antenna port or the second antenna port. Also, when the resource for the random access preamble is included in the second resource group, transmission section 104 transmits a response signal via the second antenna port. Setting section 101 to be described hereinafter may set a first resource group in which a response signal for a random access preamble is transmitted via one of the first antenna port and the second antenna port, and a second resource group in which a response signal for a random access preamble is transmitted via the second antenna port.

In addition, in terminal 200, reception section 201 to be described hereinafter receives the first reference signal transmitted via the first antenna port and the second reference signal transmitted via the second antenna port. Control section 202 to be described hereinafter selects either the first resource group in which a response signal for a random access preamble is transmitted via one of the first antenna port and the second antenna port or the second resource group in which a response signal for a random access preamble is transmitted via the second antenna port. Transmission section 203 to be described hereinafter transmits a random access preamble using a resource included in the selected one of the first resource group and the second resource group. Then, when the resource for the random access preamble is included in the first resource group, reception section 201 to be described hereinafter receives a response signal transmitted via the first antenna port or the second antenna port. Meanwhile, when the resource for the random access preamble is included in the second resource group, reception section 201 receives a response signal transmitted via the second antenna port.

The below description will be provided on the premise that base station 100 is a release 11 compliant base station, terminal 200 is a release 11 compliant terminal, and terminal 300 is a terminal compliant with any one of Rel. 8 to Rel. 10. In other words, base station 100 can communicate with a terminal compliant with any one of Rel. 8 to Rel. 11. Also, terminal 200 can communicate with a base station compliant with any one of Rel. 8 to Rel. 11. Meanwhile, terminal 300 can communicate with a terminal compliant with any one of Rel. 8 to Rel. 10, but cannot communicate with a release 11 compliant base station. The first reference signal is a DMRS, and the second reference signal is a CRS. The response signal is an RACH response.

Configuration of Base Station 100

Figure 4:
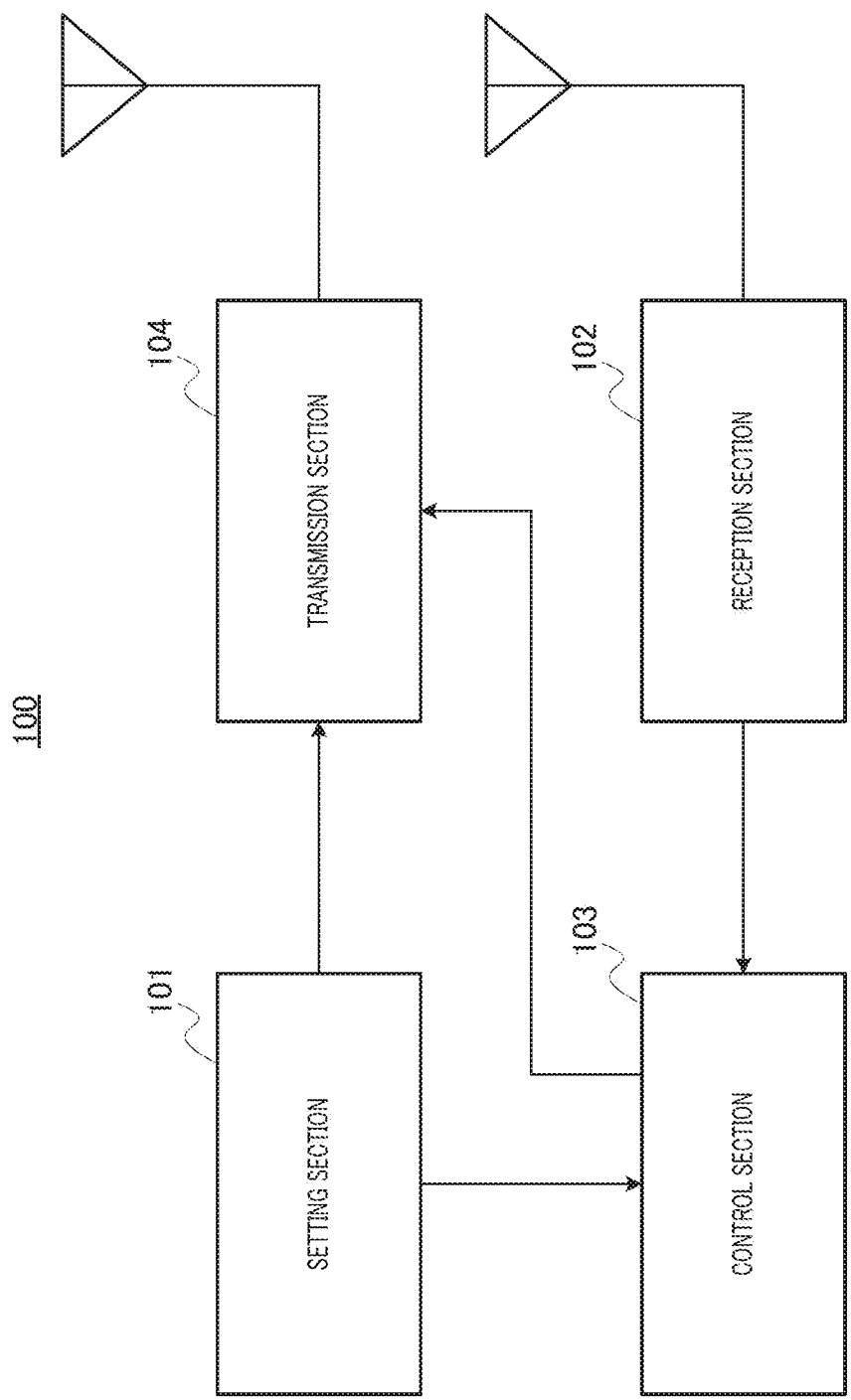
FIG. 4 is a block diagram illustrating a configuration of a base station according to Embodiment 1 of the present disclosure.

FIG. 4 is a block diagram illustrating a configuration of base station 100 according to Embodiment 1 of the present disclosure. In FIG. 4, base station 100 includes setting section 101, reception section 102, control section 103 and transmission section 104.

Setting section 101 sets a first RACH preamble resource candidate group (that is, the first resource group) that can be selected by terminal 200 that can receive an RACH response transmitted by DMRS-used data transmission (hereinafter may be referred to as "DMRS transmission"). Also, setting section 101 sets a second RACH preamble resource candidate group (that is, the second resource group) that can be selected by terminal 300 that cannot receive an RACH response transmitted by DMRS-used data transmission but can receive an RACH response transmitted by CRS-used data transmission (hereinafter may be referred to as "CRS transmission"). As described above, although the RACH preamble resource candidates are each prescribed by a combination of a time resource, a frequency resource and a sequence resource, the below description will be provided on the premise that the RACH preamble resource candidates are each prescribed by a sequence resource alone, for ease of description.

"Resource information" relating to the set first or second RACH preamble resource candidate group is included in a broadcast signal and is broadcasted to terminal 200 or terminal 300 via transmission section 104 (that is, using a broadcast channel). The resource information relating to the set first or second RACH preamble resource candidate group may be included in a control signal or a data signal and provided to terminal 200 and terminal 300 (that is, using a control channel or a data channel).

Reception section 102 receives RACH preambles transmitted from terminal 200 and terminal 300. More specifically, reception section 102 calculates a correlation between a received signal and a sequence replica corresponding to an RACH preamble resource candidate to compare the calculated correlation value and a predetermined threshold. Then, if the calculated correlation value is larger than the predetermined threshold, reception section 102 determines that reception section 102 has received an RACH preamble in an RACH preamble resource corresponding to the sequence replica used for the calculation of the correlation value. Information relating to the RACH preamble resource from which the RACH preamble has been detected is output to control section 103.

Also, reception section 102 receives an uplink data signal transmitted from a transmission source terminal using an uplink data resource specified for the transmission source terminal by an RACH response transmitted from base station 100 to terminal 200 or terminal 300 that is the transmission source terminal for the RACH preamble.

Control section 103 selects an RACH response transmission method. In other words, when a resource in which an RACH preamble has been received is included in the first RACH preamble resource candidate group, control section 103 selects DMRS transmission (that is, a first transmission method) as an RACH response transmission method. Also, when a resource in which an RACH preamble has been received is included in the second RACH preamble resource candidate group, control section 103 selects CRS transmission (that is, a second transmission method) as an RACH response transmission method.

Transmission section 104 transmits a control signal (for example, a PDCCH signal) and a data signal (for example, a PDSCH signal) in downlink.

For example, transmission section 104 transmits an RACH response using the transmission method selected by control section 103. More specifically, when control section 103 selects DMRS transmission, transmission section 104 transmits a DMRS together with an RACH response. In this case, the RACH response and the DMRS are transmitted in a same phase. In other words, the RACH response is transmitted using an antenna port that is the same as that of the DMRS to be transmitted. For example, when a weighting is applied to antennae, the RACH response and the DMRS are transmitted with same weighting applied to the antennae. Here, a transmission antenna port for DMRS is determined in advance. For example, although in Rel. 10, transmission antenna ports for DMRS can be ports 7 to 14, the transmission antenna port for DMRS for RACH response is determined to be port 7. For transmission or reception quality measurement of another data signal, a CRS may be transmitted together with the RACH response and the DMRS. On the other hand, when CRS transmission is selected by control section 103, transmission section 104 transmits a CRS together with an RACH response. In this case, the RACH response and the CRS are transmitted in a same phase. In other words, the RACH response is transmitted using an antenna port that is the same as that of the CRS to be transmitted. Here, in the case of CRS transmission, no DMRS is transmitted together with a CRS in a resource block used for transmission of an RACH response.

Moreover, transmission section 104 transmits information relating to a data resource in which an RACH response is mapped, via a PDCCH. The PDCCH signal is transmitted in a state in which the PDCCH signal has been scrambled by an identifier common to all of terminals, called RA-RNTI.

Transmission section 104 uses a transmission method that is the same as the RACH response transmission method, also in Step 4 (transmission of message 4) in an RACH procedure.

The term "antenna port" refers to a logical antenna including one or more physical antennae. In other words, an antenna port does not necessarily refer to one physical antenna, and may refer to, e.g., an array antenna including a plurality of antennae. For example, in 3GPP LTE, the number of physical antennae included in an antenna port is not defined and the antenna port is defined as the minimum unit for a base station to transmit a different reference signal. Furthermore, the antenna port may be defined as the minimum unit for multiplication of a precoding vector weighting.

Configuration of Terminal 200

Figure 5:
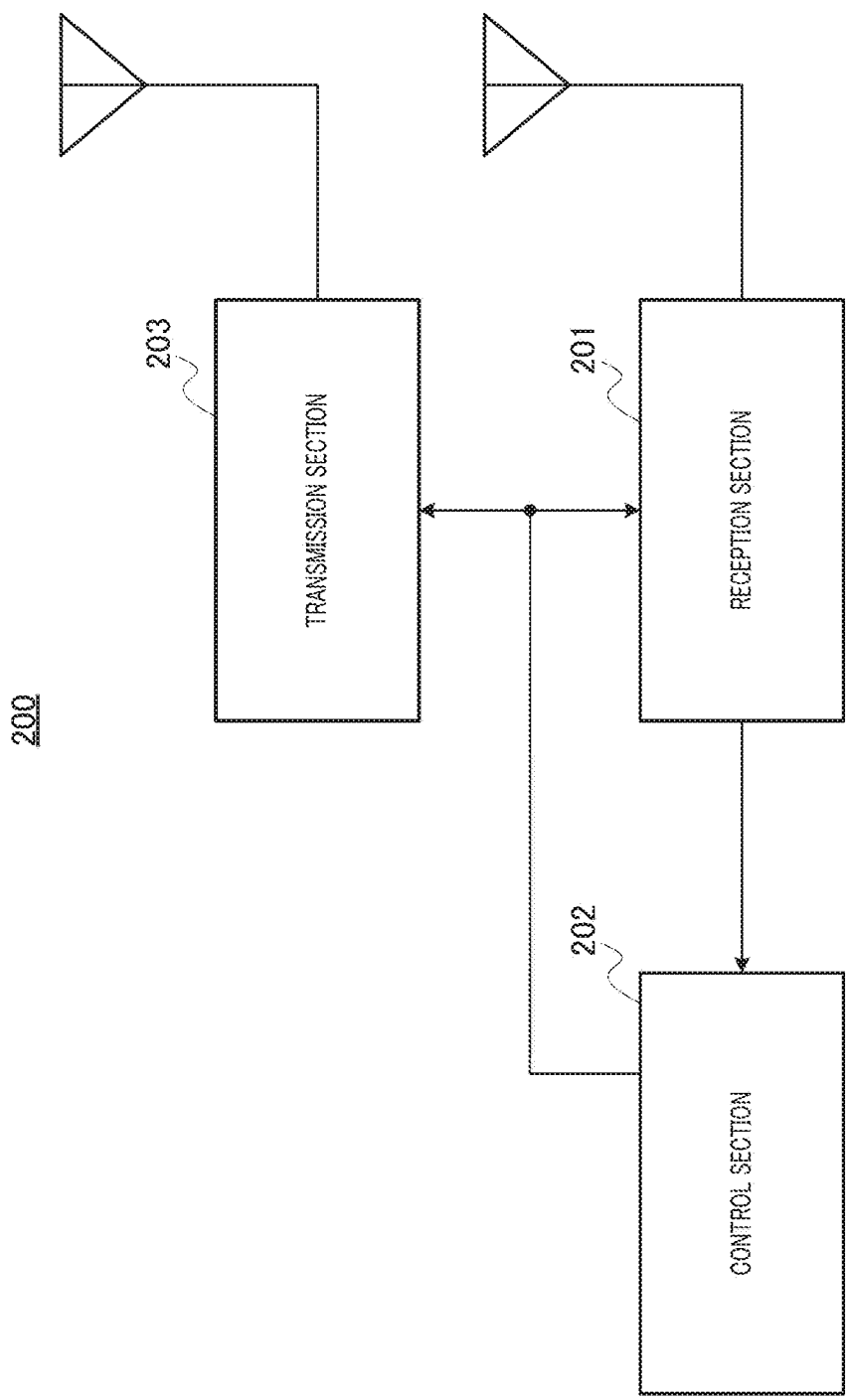
FIG. 5 is a block diagram illustrating a configuration of a terminal according to Embodiment 1 of the present disclosure.

FIG. 5 is a block diagram illustrating a configuration of terminal 200 according to Embodiment 1 of the present disclosure. In FIG. 5, terminal 200 includes reception section 201, control section 202 and transmission section 203.

Reception section 201 receives a broadcast signal transmitted from base station 100. The received broadcast signal contains resource information relating to the first RACH preamble resource candidate group or the second RACH preamble resource candidate group. Then, reception section 201 outputs the received broadcast signal to control section 202.

Also, reception section 201 receives a PDCCH signal and an RACH response transmitted from base station 100. More specifically, reception section 201 receives a PDCCH signal and receives an RACH response using a reference signal (DMRS or CRS) specified by control section 202 in a data resource specified by the received PDCCH signal.

Control section 202 sets a transmission parameter to be used in transmission section 203 and a reception parameter to be used in reception section 201, based on the broadcast signal received from reception section 201.

More specifically, when resource information relating to the first RACH preamble resource candidate group is contained in the broadcast signal, control section 202 selects an RACH preamble resource from the first RACH preamble resource candidate group. On the other hand, when no resource information relating to the first RACH preamble resource candidate group is contained in the broadcast signal, control section 202 selects an RACH preamble resource from the second RACH preamble resource candidate group indicated by the resource information contained in the broadcast signal. Information relating to the selected RACH preamble resource is output to transmission section 203.

Also, when resource information relating to the first RACH preamble resource candidate group is contained in the broadcast signal, control section 202 specifies a DMRS for reception section 201 as a reference signal to be used for RACH response reception. On the other hand, when no resource information relating to the first RACH preamble resource candidate group is contained in the broadcast signal, control section 202 specifies a CRS for reception section 201 as a reference signal to be used for RACH response reception.

Also, control section 202 outputs information relating to a data resource specified by the PDCCH signal received by reception section 201 to reception section 201.

Transmission section 203 transmits an RACH preamble using the RACH preamble resource selected by control section 202.

Operations of Base Station 100 and Terminal 200

Figure 6:
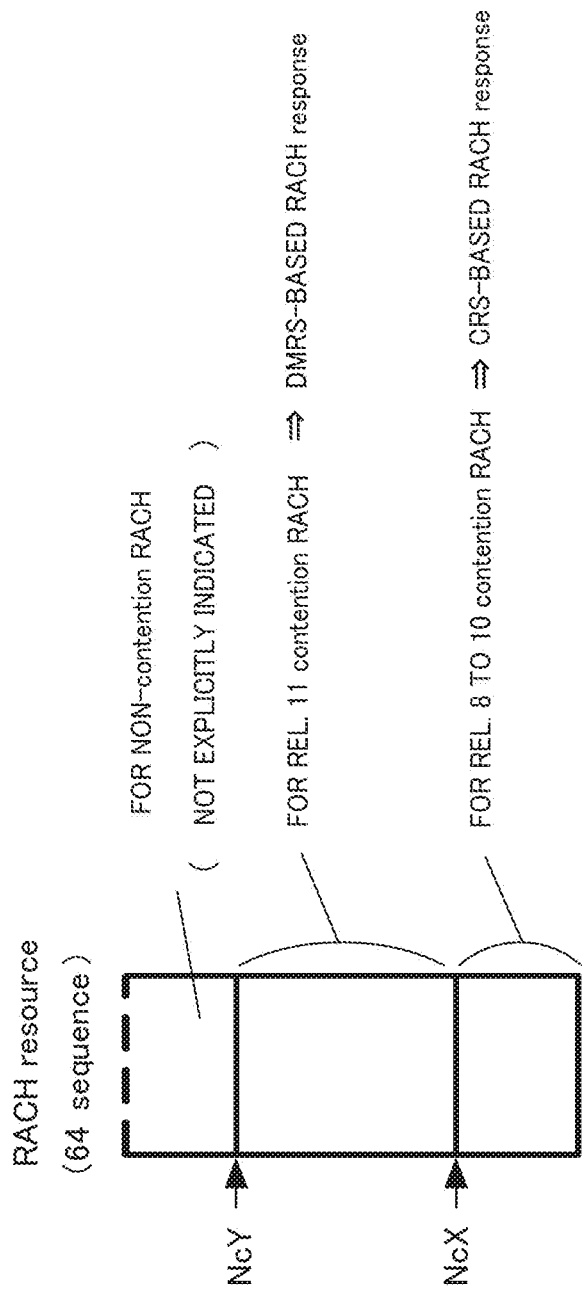
FIG. 6 is a diagram provided for description of operation of a base station and terminals according to Embodiment 1 of the present disclosure.

The operations of base station 100 and terminal 200 each having the above-described configuration will be described. FIG. 6 is a diagram provided for description of the operations of base station 100 and terminal 200. The below description will be described taking a case where 64 sequences are provided as RACH preamble resources, as an example.

Setting of RACH Preamble Resource Candidate Groups by Base Station 100

In base station 100, setting section 101 sets a first RACH preamble resource candidate group that can be selected by terminal 200 that can receive an RACH response transmitted by DMRS transmission. Also, setting section 101 sets a second RACH preamble resource candidate group that can be selected by terminal 300 that cannot receive an RACH response transmitted by DMRS-used data transmission but can receive an RACH response transmitted by CRS transmission.

Resource information relating to the set first or second RACH preamble resource candidate group is included in a broadcast signal and is broadcasted to terminal 200 or terminal 300 via transmission section 104.

As illustrated in FIG. 6, base station 100 broadcasts NcX, which is the number of resources for contention RACHs (RACHs involving contention between a plurality of terminals), to terminal 300 as resource information relating to the second RACH preamble resource candidate group. Consequently, terminal 300 interprets RACH preamble resources other than those with RACH preamble resource numbers of 1 to NcX as RACH preamble resources to be used for non-contention RACHs.

Also, base station 100 broadcasts NcY, which is the number of resources for contention RACHs (RACHs involving contention between a plurality of terminals), to terminal 200 as resource information relating to the first RACH preamble resource candidate group. Consequently, terminal 200 interprets RACH preamble resources other than those having RACH preamble resource numbers of 1 to NcY as RACH preamble resources to be used for non-contention RACHs. Also, terminal 200 interprets RACH preamble resources having RACH preamble resource numbers of NcX+1 to NcY as the first RACH preamble resource candidate group.

As described above, as a result of broadcasting NcY as resource information relating to the first RACH preamble resource candidate group, a broadcast method that is similar to that used for NcX in Rel. 8 to Rel. 10 can be reused, and backward compatibility from Rel. 8 to Rel. 10 can be maintained.

Transmission of RACH Preamble by Terminal 200

Terminal 200 selects an RACH preamble resource from the first RACH preamble resource candidate group of RACH preamble resources having RACH preamble resource numbers of NcX+1 to NcY, and transmits an RACH preamble using the selected RACH preamble resource.

Transmission of RACH Preamble by Terminal 300

Terminal 300 selects an RACH preamble resource from the second RACH preamble resource candidate group of RACH preamble resources having RACH preamble resource numbers of Nc1 to NcX, and transmits an RACH preamble using the selected RACH preamble resource.

Selection of RACH Response Transmission Method and Transmission of RACH Response by Base Station 100

In base station 100, when a resource in which an RACH preamble has been received is included in the first resource candidate group, control section 103 selects DMRS transmission (that is, a first transmission method) as an RACH response transmission method. Also, when a resource in which the RACH preamble has been received is included in the second resource candidate group, control section 103 selects CRS transmission (that is, a second transmission method) as an RACH response transmission method.

When DMRS transmission is selected by control section 103, transmission section 104 transmits a DMRS together with an RACH response. On the other hand, when CRS transmission is selected by control section 103, transmission section 104 transmits a CRS together with an RACH response.

Reception of PDCCH Signal and RACH Response by Terminal 200

When resource information relating to the first RACH preamble resource candidate group is contained in a broadcast signal, control section 202 specifies a DMRS for reception section 201 as a reference signal to be used for RACH response reception. On the other hand, when no resource information relating to the first RACH preamble resource candidate group is contained in a broadcast signal, control section 202 specifies a CRS for reception section 201 as a reference signal to be used for RACH response reception.

Also, control section 202 outputs information relating to a data resource specified by a PDCCH signal received by reception section 201 to reception section 201. Here, the PDCCH signal is one scrambled in base station 100 based on an RA-RNTI that depends on the subframe used for transmission of an RACH preamble. Thus, reception section 201 descrambles the PDCCH signal based on the RA-RNTI to receive the PDCCH signal.

Reception section 201 receives an RACH response in the data resource specified by the received PDCCH signal, using the reference signal (DMRS or CRS) specified by control section 202.

Here, when no information of NcY is provided to terminal 200, terminal 200 assumes that a connection destination base station is a conventional base station, and transmits an RACH preamble using an RACH preamble resource selected from the second RACH preamble resource candidate group of RACH preamble resources having RACH preamble resource numbers of Nc1 to NcX. Also, in this case, terminal 200 receives an RACH response using a CRS.

In any transmission after RACH response transmission until setting of a transmission mode for terminal 200 (for example, transmission of message 4), also, base station 100 transmits a PDSCH to terminal 200 by DMRS transmission, and terminal 200 demodulates the PDSCH using a DMRS. Here, a port for transmission of the DMRS may be previously determined as, for example, port 7 or indication of such port may be provided via the PDCCH. Then, after setting of a transmission mode for terminal 200, transmission of a PDSCH according to the transmission mode is performed.

As described above, according to the present embodiment, in base station 100, setting section 101 sets a first RACH preamble resource candidate group that can be selected by terminal 200 that can receive an RACH response transmitted by DMRS transmission. Also, setting section 101 sets a second RACH preamble resource candidate group that can be selected by terminal 300 that cannot receive an RACH response transmitted by DMRS transmission but can receive an RACH response transmitted by CRS transmission. Then, when the resource in which an RACH preamble has been received is included in the first RACH preamble resource candidate group, control section 103 selects DMRS transmission as an RACH response transmission method. Also, when the resource in which the RACH preamble has been received is included in the second RACH preamble resource candidate group, control section 103 selects CRS transmission as an RACH response transmission method.

Consequently, base station 100 can determine, based on the resource in which the RACH preamble has been detected, whether or not a terminal that is the transmission source of the RACH preamble is a terminal that can receive an RACH response transmitted by DMRS transmission. Thus, it is possible to efficiently transmit an RACH response directed to a terminal that supports DMRS-used RACH response reception, by DMRS transmission, to a terminal that can receive an RACH response transmitted by DMRS transmission.

Then, DMRS transmission enables transmission of an RACH response using an MBSFN subframe, which enables prevention of a reduction in the resource capacities of non-MBSFN subframes, and as a result, the system capacity can increase. Furthermore, no RACH response is transmitted to terminal 300 by DMRS transmission, which enables prevention of an increase in the number of RACH preamble retransmissions to terminal 300.

Also, in a heterogeneous network environment in which a cell ID that is the same as that of an HPN is used for a plurality of LPNs in a macrocell, it is possible to efficiently transmit an RACH response to a terminal that can receive an RACH response transmitted by DMRS transmission only from a transmission point close to a position where the terminal is located. For example, a base station transmits an RACH response only from a transmission point at which received power of the RACH preamble is high.

Also, in a system operation using extension carrier, it is possible to efficiently transmit an RACH response using an extension carrier by DMRS transmission to a terminal that can receive an RACH response transmitted by DMRS transmission. Also, the congestion of backward compatible carriers can be reduced.

In base station 100, control section 103 may include, in one RACH response, a plurality of response messages respectively for a plurality of RACH preambles received during a same processing period using RACH preamble resources in the first RACH preamble resource candidate group and transmit the RACH response by DMRS transmission. Also, control section 103 may include, in one RACH response, a plurality of response messages for a plurality of RACH preambles received during a same processing period using RACH preamble resources included in the second RACH preamble resource candidate group and transmit the RACH response by CRS transmission.

Embodiment 2

In Embodiment 2, in the case where a resource in which an RACH preamble has been received is included in a first RACH preamble resource candidate group, DMRS transmission is selected only when a subframe in which an RACH response is transmitted is an "MBSFN subframe." On the other hand, when a subframe in which an RACH response is transmitted is a "non-MBSFN subframe," CRS transmission is selected. Here, "MBSFN subframe" is a subframe in which a CRS cannot be mapped but a DMRS can be mapped in a resource region other than a head portion of the subframe. "Non-MB SFN subframe" is a subframe in which a DMRS and a CRS can be mapped in a resource region other than a head portion of the subframe. Here, a base station and a terminal according to Embodiment 2 are similar to base station 100 and terminal 200 according to Embodiment 1, and thus, a description will be provided below with reference to FIGS. 4 and 5.

In base station 100 in Embodiment 2, in the case where a resource in which an RACH preamble has been received is included in the first RACH preamble resource candidate group, control section 103 selects DMRS transmission only when a subframe in which an RACH response is transmitted is an "MBSFN subframe." On the other hand, when a subframe in which an RACH response is transmitted is a "non-MBSFN subframe," control section 103 selects CRS transmission.

Also, in the case where a resource in which an RACH preamble has been received is included in a second RACH preamble resource candidate group, control section 103 selects CRS transmission only in the case of a "non-MBSFN subframe." In other words, in the case where a resource in which an RACH preamble has been received is included in the second RACH preamble resource candidate group, no RACH response is transmitted in the case of an "MBSFN subframe."

Transmission section 104 includes a plurality of response messages for a plurality of RACH preambles in one RACH response and transmits the RACH response. The plurality of response messages included in one RACH response correspond to a plurality of RACH preambles received during a same processing period.

More specifically, when a subframe in which an RACH response is transmitted is an "MBSFN subframe," control section 103 includes, in one RACH response, a plurality of response messages for a plurality of RACH preambles transmitted using RACH preamble resources included in the first RACH preamble resource candidate group. Then, control section 103 transmits the RACH response by DMRS transmission. On the other hand, when a subframe in which an RACH response is transmitted is a "non-MBSFN subframe," control section 103 includes a plurality of response messages for a plurality of RACH preambles in one RACH response regardless of whether the RACH preamble resource used for transmission is included in the first RACH preamble resource candidate group or the second RACH preamble resource candidate group. Then, control section 103 transmits the RACH response by CRS transmission.

When resource information relating to the first RACH preamble resource candidate group is contained in a broadcast signal, and also when a subframe in which an RACH response is received is an "MBSFN subframe," control section 202 in terminal 200 specifies a DMRS for reception section 201 as a reference signal to be used for RACH response reception. On the other hand, when resource information relating to the first RACH preamble resource candidate group is contained in a broadcast signal, and also when a subframe in which an RACH response is received is a "non-MBSFN subframe," control section 202 specifies a CRS for reception section 201 as a reference signal to be used for RACH response reception.

As described above, according to the present embodiment, in base station 100, when a resource in which an RACH preamble has been received is included in the first RACH preamble resource candidate group, control section 103 selects DMRS transmission only when a subframe in which a response signal is transmitted is a first subframe (MBSFN subframe) in which no CRS can be mapped but a DMRS can be mapped in a resource region other than a head portion of the subframe. Meanwhile, control section 103 selects CRS transmission when a subframe in which a response signal is transmitted is a second subframe (non-MBSFN subframe) in which a DMRS and a CRS can be mapped in a resource region other than a head portion of the subframe.

Consequently, in an MBSFN subframe, an RACH response can be transmitted by DMRS, which enables prevention of a reduction in the resource capacities of the non-MBSFN subframes, and as a result, the system capacity can be increased. Also, terminal 200 only needs to receive a response signal using a CRS in a non-MBSFN subframe, which enables simplification of control.

Moreover, when a subframe in which an RACH response is transmitted is a non-MBSFN subframe, control section 103 includes a plurality of response messages for a plurality of RACH preambles in one RACH response regardless of whether an RACH preamble resource used for transmission is included in the first RACH preamble resource candidate group or the second RACH preamble resource candidate group. Then, control section 103 transmits the RACH response by CRS transmission.

Consequently, in particular, when there are many terminals 300, PDCCH and PDSCH congestion can be reduced. This is because, when there are many terminals 300, the following overhead reduction effect is larger than the effect of transmission efficiency enhancement that can be obtained by transmitting an RACH response to terminal 200 by DMRS transmission separately from terminal 300. In other words, in this case, an effect of reduction of overhead for PDCCH or CRC is larger than the aforementioned effect of transmission efficiency enhancement that can be obtained by including a plurality of response messages respectively for terminal 200 and terminal 300 in one RACH response and transmitting the RACH response.

Base station 100 may indicate to terminal 200 whether CRS transmission or DMRS transmission is selected for a non-MBSFN subframe, via a PDCCH. In this case, terminal 200 receives an RACH response according to this indication. Consequently, base station 100 can select whether response messages to terminal 200 and terminal 300 are collected in one RACH response and transmitted by CRS transmission or a response message to terminal 200 is transmitted by DMRS transmission independently from a response message to terminal 300 in a non-MBSFN subframe, according to, e.g., the degree of congestion of PDCCH or PDSCH.

The above description has been provided taking an MBSFN subframe and non-MBSFN subframe as examples. However, the present disclosure is not limited to these examples, and when a resource in which an RACH preamble has been received is included in the first RACH preamble resource candidate group, it is possible to select DMRS transmission for one of two other types of subframes and CRS transmission for the other one of the two other types of subframes.

Embodiment 3

In Embodiment 3, a third RACH preamble resource candidate group in a first RACH preamble resource candidate group is set for a first preamble transmission apparatus having a propagation attenuation value (hereinafter may be referred to as "path loss") between a base station and the terminal is larger than a threshold. Also, in Embodiment 3, a fourth RACH preamble resource candidate group, which is not included in the third RACH preamble resource candidate group in the first RACH preamble resource candidate group, is set for a first preamble transmission apparatus having a propagation attenuation value between a base station and the terminal is smaller than the threshold. Here, the base station and the terminal according to Embodiment 3 are similar to base station 100 and terminal 200 according to Embodiment 1, and thus, a description will be provided with reference to FIGS. 4 and 5.

In base station 100 in Embodiment 3, setting section 101 sets a threshold (Thp). The threshold (Thp) is used as a selection criterion for an RACH preamble resource candidate group.

Also, setting section 101 sets the transmission power of a CRS to be transmitted from base station 100.

Resource information relating to a plurality of RACH preamble resource candidate groups prescribed in a transmission method determination table, information relating to set threshold (Thp) and information relating to CRS transmission power are included in a broadcast signal and are broadcasted to terminal 200 or terminal 300 via transmission section 104 (that is, using a broadcast channel). The resource information relating to the plurality of RACH preamble resource candidate groups prescribed in the transmission method determination table, the information relating to set threshold (Thp) and the information relating to transmission power may be included in a control signal or a data signal and indicated to terminal 200 or terminal 300 (that is, using a control channel or a data channel).

Control section 103 selects an RACH response transmission method based on a resource in which an RACH preamble has been received and the transmission method determination table.

More specifically, in the transmission method determination table, the plurality of RACH preamble resource candidate groups are prescribed, a combination of DMRS transmission or CRS transmission and at least one of transmission power and a code rate is associated with each of the RACH preamble resource candidate groups. Then, control section 103 selects a combination associated with an RACH preamble resource candidate group including the resource in which the RACH preamble has been received, as a transmission method.

Transmission section 104 transmits an RACH response using the transmission method selected by control section 103.

In terminal 200 in Embodiment 3, reception section 201 receives the broadcast signal transmitted from base station 100. The received broadcast signal contains the resource information relating to the plurality of RACH preamble resource candidate groups prescribed in the transmission method determination table, the information relating to threshold (Thp) and the information relating to the transmission power. Then, reception section 201 outputs the received broadcast signal to control section 202.

Also, reception section 201 measures received power of the CRS transmitted from base station 100 and outputs a value of the measurement to control section 202.

Control section 202 calculates a propagation attenuation amount between base station 100 and terminal 200 based on the received CRS power value measured by reception section 201 and the CRS transmission power value from base station 100.

Then, control section 202 sets a transmission parameter to be used in transmission section 203 and a reception parameter to be used in reception section 201, based on the broadcast signal, an RACH preamble resource candidate group determination table and the propagation attenuation amount calculated by control section 202.

For example, control section 202 selects an RACH preamble resource candidate group to be used by terminal 200, based on the broadcast signal, the RACH preamble resource candidate group determination table and the propagation attenuation amount calculated by control section 202. The RACH preamble resource candidate group determination table is the same as the transmission method determination table in base station 100.

More specifically, in the RACH preamble resource candidate group determination table, a plurality of RACH preamble resource candidate groups are prescribed, a combination of DMRS transmission or CRS transmission and at least one of transmission power and a code rate is associated with each of the RACH preamble resource candidate groups. Also, a magnitude relationship between a propagation attenuation amount and threshold (Thp) is associated with each RACH preamble resource candidate group.

The operations of base station 100 and terminal 200 each having the above configuration will be described. The below description will be provided taking two transmission method determination tables (or RACH preamble resource candidate group determination tables) as examples.

Table Example 1

FIG. 7 is a diagram illustrating a first example of a transmission method determination table. In the table illustrated in FIG. 7, the first RACH preamble resource candidate group is divided into two groups that are group 1A and group 1B. Also, the second RACH preamble resource candidate group is also divided into two groups that are group 2 and group 2B.

Setting of RACH Preamble Resource Candidate Groups by Base Station 100

In base station 100, setting section 101 sets four RACH preamble resource candidate groups corresponding respectively to groups 1A, 1B, 2A and 2B. Here, in addition to NcX and NcY, which are broadcasted in Embodiment 1, NcY_pl indicating a boundary between group 1A and group 1B and NcX_pl indicating a boundary between group 2A and group 2B are broadcasted. Consequently, terminal 200 can identify group 1A, group 1B, group 2A and group 2B.

Transmission of RACH Preamble by Terminal 200

Terminal 200 selects an RACH preamble resource candidate group to be used in terminal 200, based on the RACH preamble resource candidate group determination table and a propagation attenuation amount calculated by control section 202.

More specifically, when the calculated propagation attenuation amount is equal to or larger than threshold Thp, terminal 200 selects group 1A as an RACH preamble resource candidate group to be used in terminal 200. On the other hand, when the calculated propagation attenuation amount is smaller than threshold Thp, terminal 200 selects group 1B as an RACH preamble resource candidate group to be used in terminal 200.

Selection of RACH Response Transmission Method by Base Station 100 and RACH Response Transmission When a resource in which an RACH preamble has been received is included in group 1A, base station 100 selects a combination of DMRS transmission, large transmission power and a low code rate, as an RACH response transmission method. This is because, when a resource in which an RACH preamble has been received is included in group 1A, it can be determined that the terminal that is the transmission source of the RACH preamble is a terminal that supports DMRS transmission and is also a terminal having a large propagation attenuation amount (that is, a poor communication quality). Also, the amount of resources allocated for uplink data transmission may be increased.

Meanwhile, when a resource in which an RACH preamble has been received is included in group 1B, base station 100 selects a combination of DMRS transmission, small transmission power and a high code rate as an RACH response transmission method. This is because, when a resource in which an RACH preamble has been received is included in group 1B, it can be determined that the terminal that is the transmission source of the RACH preamble is a terminal that supports DMRS transmission and also is a terminal having a small propagation attenuation amount (that is, a good communication quality). Also, the amount of resources allocated for uplink data transmission may be decreased.

Also, when a resource in which an RACH preamble has been received is included in group 2A, base station 100 selects a combination of CRS transmission, large transmission power and a low code rate as an RACH response transmission method.

When a resource in which an RACH preamble has been received is included in group 2B, base station 100 selects a combination of CRS transmission, small transmission power and a high code rate as an RACH response transmission method.

As described above, as a result of the first RACH preamble resource candidate group and the second RACH preamble resource candidate group are further divided into groups based on the propagation attenuation amounts, base station 100 can recognize a propagation channel state of the terminal that is the transmission source of an RACH preamble. Consequently, base station 100 can transmit an RACH response with necessary and sufficient transmission power. Also, base station 100 can allocate a necessary and sufficient uplink resource, allowing terminal 200 to efficiently transmit uplink data.

Table Example 2

FIG. 8 is a diagram illustrating a second example of a transmission method determination table. In the table illustrated in FIG. 8, a second RACH preamble resource candidate group is also divided into two groups that are group 2A and group 2B. However, the first RACH preamble resource candidate group is not divided and is indicated as group 1.

Setting of RACH Preamble Resource Candidate Groups by Base Station 100

Figure 9:
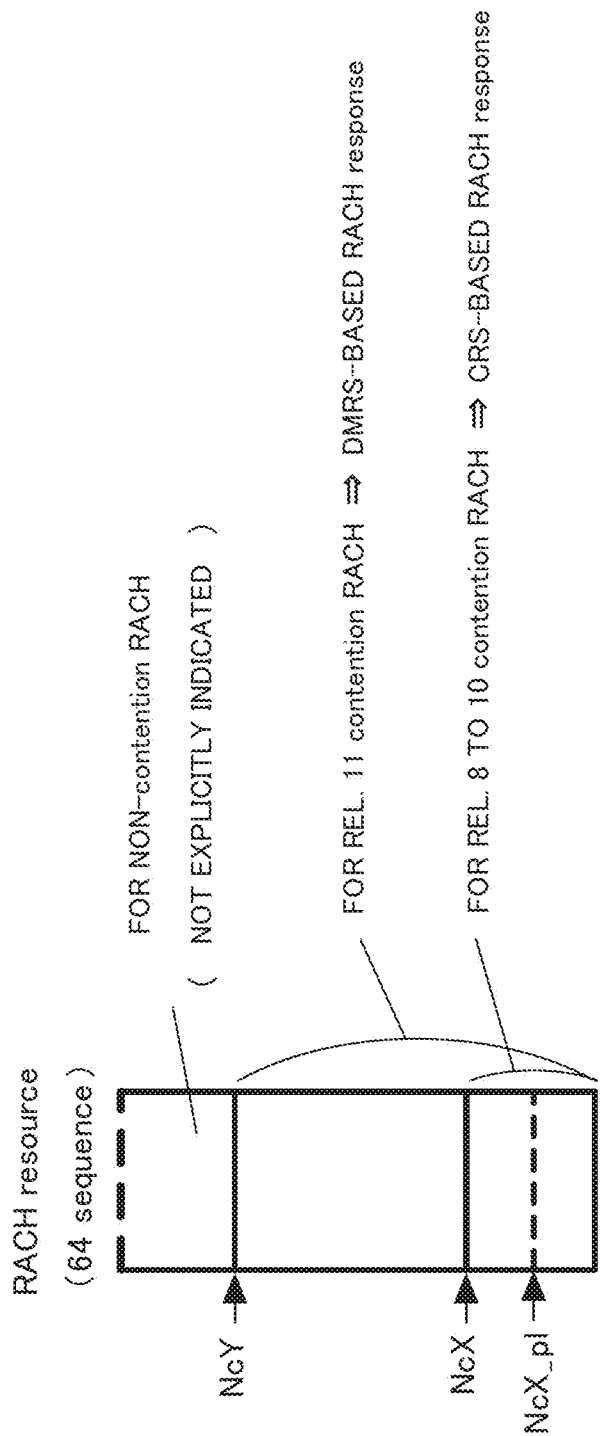
FIG. 9 is a diagram provided for description of operation of a base station and terminals according to Embodiment 3 of the present disclosure.

In base station 100, setting section 101 sets three RACH preamble resource candidate groups corresponding respectively to groups 1, 2A and 2B. Here, as illustrated in FIG. 9, in addition to NcX and NcY, which are broadcasted in Embodiment 1, NcX_p1 indicating a boundary between group 2A and group 2B is broadcasted. Consequently, terminal 200 can identify group 1, group 2A and group 2B. In other words, terminal 200 interprets, for example, RACH preamble resources having RACH preamble resource numbers of 1 to NcX_p1 as group 2A, and RACH preamble resources having RACH preamble resource numbers of NcX_p1+1 to NcY as group 2B.

Transmission of RACH Preamble by Terminal 200

When a propagation attenuation amount calculated in control section 202 is smaller than threshold Thp, terminal 200 selects an RACH preamble resource from group 1 of RACH preamble resources having RACH preamble resource numbers of NcX+1 to NcY and transmits an RACH preamble using the selected RACH preamble resource.

On the other hand, when a propagation attenuation amount calculated in control section 202 is equal to or larger than threshold Thp, terminal 200 selects an RACH preamble resource from group 2A of RACH preamble resources having RACH preamble resource numbers of 1 to NcX_p1, and transmits an RACH preamble using the selected RACH preamble resource. In other words, an RACH preamble resource candidate group to be used when a propagation attenuation amount calculated in control section 202 is equal to or larger than threshold Thp is common to terminal 200 and terminal 300.

Selection of RACH Response Transmission Method by Base Station 100 and Transmission of RACH Response When a resource in which an RACH preamble has been received is included in group 1, base station 100 selects a combination of DMRS transmission, large transmission power and a low code rate as an RACH response transmission method. This is because, when a resource in which an RACH preamble has been received is included in group 1, it can be determined that the terminal that is the transmission source of the RACH preamble is a terminal that supports DMRS transmission and also is a terminal having a large propagation attenuation amount (that is, a poor communication quality). Also, the amount of resources to be allocated for uplink data transmission may be increased.

When a resource in which an RACH preamble has been received is included in group 2A, base station 100 selects a combination of CRS transmission, large transmission power and a low code rate as an RACH response transmission method.

When a resource in which an RACH preamble has been received is included in group 2B, base station 100 selects a combination of CRS transmission, small transmission power and a high code rate as an RACH response transmission method.

Here, in table example 1, division into finer groups is performed. Thus, the resource amount per group becomes small, so that the probability that RACH preamble resources are concentrated in a particular group becomes high, and as a result, the probability of a collision between RACH preambles becomes high. On the other hand, in table example 2, there is one group to be assigned only to terminal 200, enabling a reduction in the probability of a collision between RACH preambles. Also, in a CoMP operation using a same cell ID, it is appropriate to transmit an RACH response via all transmission points by CRS transmission to terminal 200 having a lower reception quality (for example, terminal 200 located in the vicinity of a cell boundary), and thus the advantage of high efficiency provided by DMRS transmission is small. Thus, for terminal 200 having a large propagation attenuation amount, transmission of an RACH response by CRS transmission does not cause inefficiency.

In Rel. 8 to Rel. 10, RACH preamble resource groups are set according to uplink transmission data amounts. Although in the above description, division into groups is performed according to propagation attenuation amounts also for terminal 300, the present disclosure is not limited to this case, and further division into groups may be performed according to transmission data amounts. Consequently, the amount of resources to be allocated for uplink can properly be controlled according to a group including a detected RACH preamble, which enables uplink data to be efficiently transmitted with a necessary and sufficient resource.

Although the above description has been provided taking propagation attenuation amount as an example, the present disclosure is not limited to this case, and, e.g., received power, SIR or SINR may be used.

Embodiment 4

In Embodiment 1, DMRS transmission or CRS transmission is selected as an RACH response transmission method according to an RACH preamble resource candidate group including a resource in which an RACH preamble has been received. On the other hand, in Embodiment 4, a first RACH preamble resource candidate group to be assigned to a first terminal group and a second RACH preamble resource candidate group to be assigned to a second terminal group are set. In addition, in Embodiment 4, different retransmission determination periods are set for the first terminal group and the second terminal group. Also, in Embodiment 4, the RACH response transmission timing is adjusted according to an RACH preamble resource candidate group including a resource in which an RACH preamble has been received.

Configuration of Base Station 400

Figure 10:
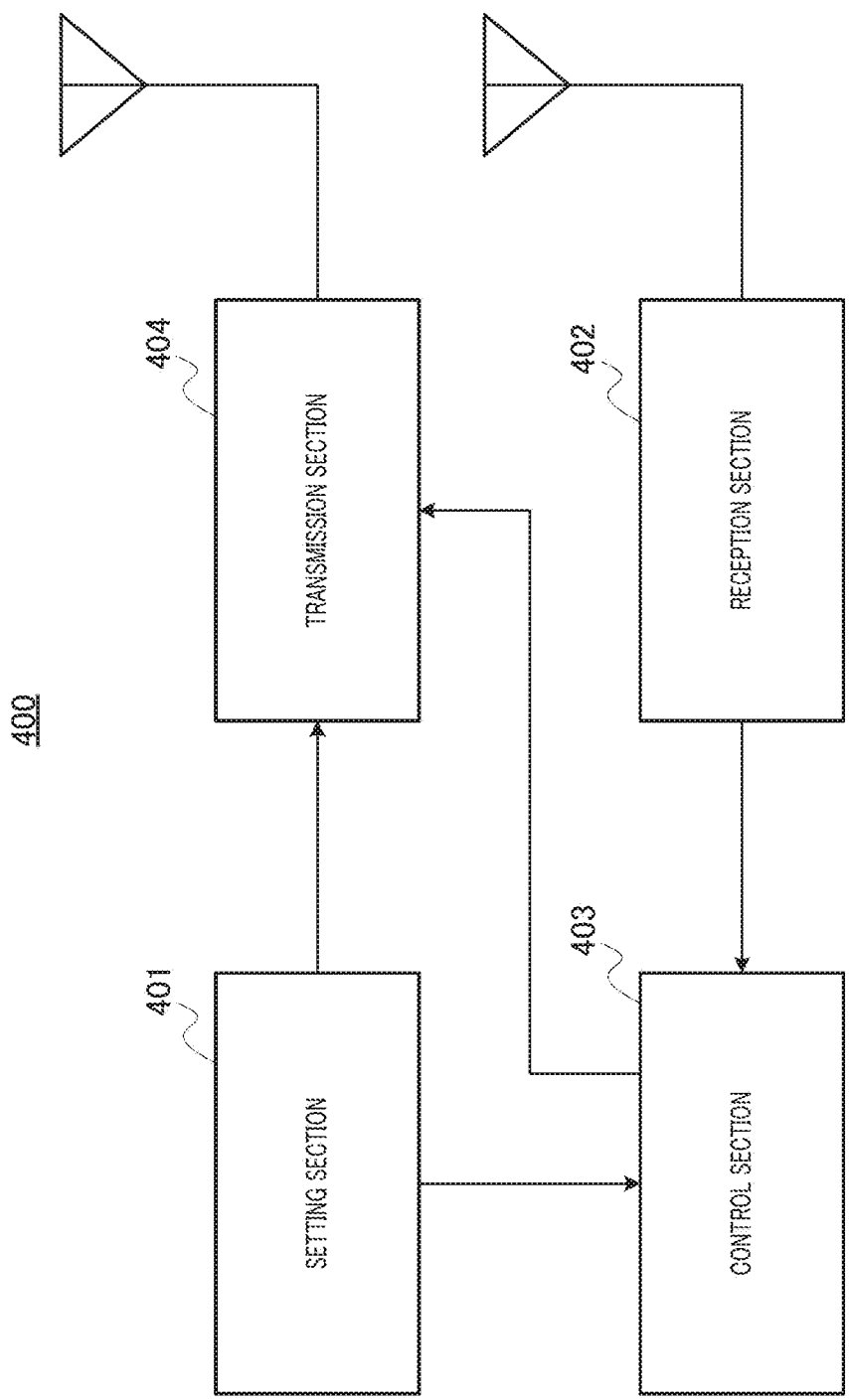
FIG. 10 is a block diagram illustrating a configuration of a base station according to Embodiment 4 of the present disclosure.

FIG. 10 is a block diagram illustrating a configuration of base station 400 according to Embodiment 4 of the present disclosure. In FIG. 10, base station 400 includes setting section 401, reception section 402, control section 403 and transmission section 404.

Setting section 401 sets a first RACH preamble resource candidate group to be used by a first terminal group, and a second RACH preamble resource candidate group to be used by a second terminal group. "Resource information" relating to the set first or second RACH preamble resource candidate group is included in a broadcast signal and is broadcasted to terminal 500 via transmission section 404 (that is, using a broadcast channel).

Also, setting section 401 sets a first retransmission determination period to be used by the first terminal group and a second retransmission determination period to be used by the second terminal group. Period information relating to the set first and second retransmission determination periods is included in the broadcast signal and is broadcasted to terminal 500 via transmission section 404 (that is, using the broadcast channel). The first retransmission determination period is shorter than the second retransmission determination period. Here, a retransmission determination period is a time window. The size of time window may be referred to as a window size (RRC parameter: ra-ResponseWindow Size).

Reception section 402 receives an RACH preamble transmitted from terminal 500.

Control section 403 selects an RACH response transmission method. In other words, when a resource in which the RACH preamble has been received is included in the first RACH preamble resource candidate group, control section 403 selects a first transmission timing as an RACH response transmission method. Also, when a resource in which the RACH preamble has been received is included in the second RACH preamble resource candidate group, control section 403 selects a second transmission timing as an RACH response transmission method. Here, the first transmission timing is included in a period that starts three subframes following a subframe in which the RACH preamble has been detected and has a width of a first window size. Also, the second transmission timing is a period that starts three subframes following a subframe in which the RACH preamble has been detected and has a width of a second window size, but is not included in the period that starts three subframes following a subframe in which the RACH preamble has been detected and has a width of the first window size. In other words, the first transmission timing is a timing according to the first retransmission determination period, and the second transmission timing is a timing according to the second retransmission determination period. Here, the first retransmission determination period is shorter than the second retransmission determination period.

Transmission section 404 transmits an RACH response using the transmission method (that is, the transmission timing) selected by control section 403. Also, transmission section 404 transmits information relating to a data resource in which the RACH response is mapped, via a PDCCH.

Configuration of Terminal 500

Figure 11:
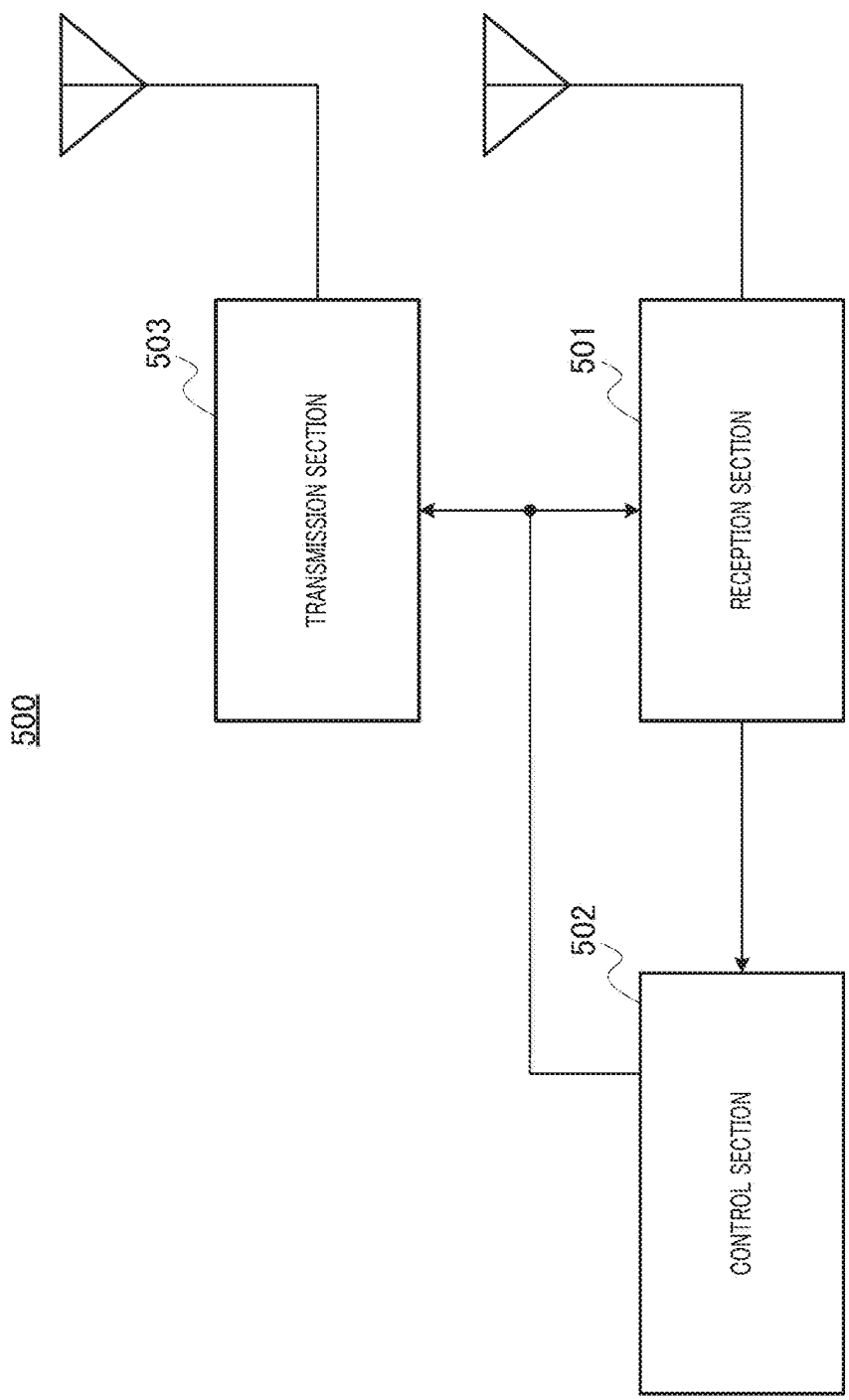
FIG. 11 is a block diagram illustrating a configuration of a terminal according to Embodiment 4 of the present disclosure.

FIG. 11 is a block diagram illustrating a configuration of terminal 500 according to Embodiment 4 of the present disclosure. In FIG. 11, terminal 500 includes reception section 501, control section 502 and transmission section 503.

Reception section 501 receives a broadcast signal transmitted from base station 400. The received broadcast signal includes the resource information relating to the first RACH preamble resource candidate group or the second RACH preamble resource candidate group. Also, the received broadcast signal includes the period information relating to the set first and second retransmission determination periods. Then, reception section 501 outputs the received broadcast signal to control section 502.

Reception section 501 performs reception processing for receiving an RACH response transmitted from base station 400 in a retransmission determination period specified by control section 502.

When terminal 500 belongs to the first terminal group, control section 502 selects an RACH preamble resource from the first RACH preamble resource candidate group. On the other hand, if terminal 500 belongs to the second terminal group, control section 502 selects an RACH preamble resource from the second RACH preamble resource candidate group. Information relating to the selected RACH preamble resource is output to transmission section 503.

When terminal 500 belongs to the first terminal group, control section 502 specifies the first retransmission determination period for reception section 501. On the other hand, when terminal 500 belongs to the second terminal group, control section 502 specifies the second retransmission determination period for reception section 501. Here, the first retransmission determination period is a period that starts three subframes following a subframe in which the RACH preamble has been transmitted and has a width of the first window size. On the other hand, the second retransmission determination period is a period that starts three subframes following the subframe in which the RACH preamble has been transmitted and has a width of the second window size.

Transmission section 503 transmits an RACH preamble using the RACH preamble resource selected by control section 502.

As described above, according to the present embodiment, in base station 400, setting section 401 sets a first RACH preamble resource candidate group to be used by a first terminal group and a second RACH preamble resource candidate group to be used by a second terminal group. Also, setting section 401 sets a first retransmission determination period to be used by the first terminal group and a second retransmission determination period to be used by the second terminal group. The first retransmission determination period is shorter than the second retransmission determination period. Then, when a resource in which an RACH preamble has been received is included in the first RACH preamble resource candidate group, control section 403 selects a first transmission timing as an RACH response transmission method. On the other hand, when a resource in which an RACH preamble has been received is included in the second RACH preamble resource candidate group, control section 403 selects a second transmission timing as an RACH response transmission method. Here, the first retransmission determination period is shorter than the second retransmission determination period.

Figure 12:
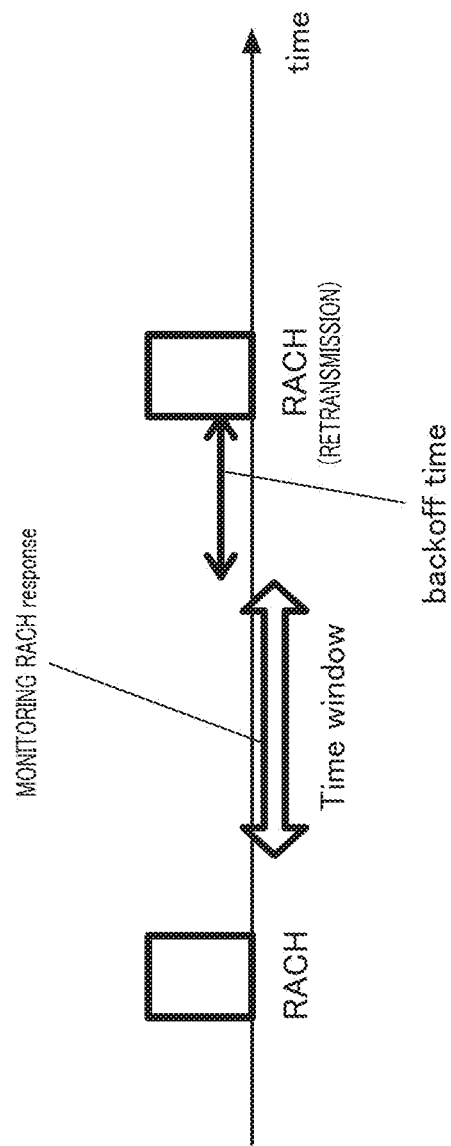
FIG. 12 is a diagram provided for description of another example of a retransmission determination period.

Although the above description has been provided on the premise that a retransmission determination period is a time window, the present disclosure is not limited to this case, and a retransmission determination period may be a sum of a time window and backoff time (see FIG. 12).

Furthermore, Embodiment 4 may be combined with any of Embodiments 1 to 3. For example, if Embodiments 1 and 4 are combined, in base station 100, setting section 101 sets a first RACH preamble resource candidate group that can be selected by terminal 200 that can receive an RACH response transmitted by DMRS-used data transmission (hereinafter may be referred to as "DMRS transmission"). In addition, setting section 101 sets a second RACH preamble resource candidate group that can be selected by terminal 300 that cannot receive an RACH response transmitted by DMRS-used data transmission but can receive an RACH response transmitted by CRS-used data transmission (hereinafter may be referred to as "CRS transmission"). Also, setting section 101 sets a first retransmission determination period to be used by terminal 200 and a second retransmission determination period to be used by terminal 300. Then, when a resource in which an RACH preamble has been received is included in the first RACH preamble resource candidate group, control section 103 selects a first transmission timing and DMRS transmission as an RACH response transmission method. In addition, when a resource in which an RACH preamble has been received is included in the second RACH preamble resource candidate group, control section 103 selects a second transmission timing and CRS transmission as an RACH response transmission method. Then, in terminal 200, when resource information relating to the first RACH preamble resource candidate group is included in a broadcast signal, control section 202 specifies a DMRS for reception section 201 as a reference signal to be used for RACH response reception, and also specifies the first retransmission determination period. On the other hand, when no resource information relating to the first RACH preamble resource candidate group is included in a broadcast signal, control section 202 specifies a CRS for reception section 201 as a reference signal to be used for RACH response reception, and also specifies the second retransmission determination period.

Figure 2:
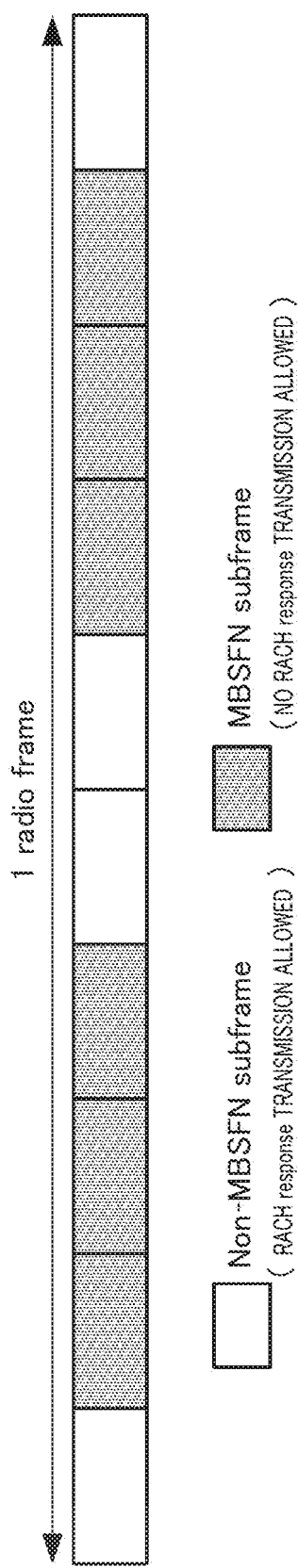
FIG. 2 is a diagram provided for description of subframes in which an RACH response is transmitted.

As described above, base station 100 sets a window size for terminal 200, the window size being different from that of terminal 300, providing the following effects. When many MBSFN subframes are set in a frame (for example, FIG. 2), terminal 300 cannot receive an RACH response via an MB SFN subframe, requiring a long window size. Meanwhile, terminal 200 can receive an RACH response via an MBSFN subframe. Thus, a short window size is set for terminal 200 separately from terminal 300, which enables a reduction in time to RACH retransmission. Accordingly, delay in completion of an RACH procedure can be reduced. When no RACH response is detected in a window, backoff time, which is delay time to retransmission, may be set. In this case, first backoff time for terminal 200 and second backoff time for terminal 300 may be different from each other. In this case, the first backoff time may be shorter than the second backoff time. This is because, since there are many resources (subframes and component carriers) that can be used to transmit an RACH response to terminal 200, even if RACHs are frequently transmitted, a sufficient capacity for RACH responses remains. As opposed to the above, the first backoff time may be longer than the second backoff time. This is because, since the second time window is set to be longer than the first time window, setting the second backoff time to be short enables a reduction in delay of terminal 300.

Other Embodiments

[1] NcX indicating an RACH preamble resource candidate group in the above embodiments may be numberOfRA-Preambles, which is an RRC parameter in Rel. 10.

[2] In each of the above embodiments, an RACH response to terminal 200 (or terminal 500) may be transmitted via, for example, a control channel to be transmitted by DMRS transmission (for example, an E-PDCCH to be transmitted using a data resource). In this case, a control channel is efficiently transmitted using a DMRS.

[3] Although each of the above embodiments has been described taking an RACH as an example, a PUSCH (or PUCCH) may be employed in the case of a contention-based transmission method. For example, while a terminal that does not support DMRS reception uses an RACH, a terminal that supports DMRS reception uses a contention PUSCH (or PUCCH). Also, PUSCH resources may be divided into a group of resources for terminals that do not support DMRS reception and a group of resources for terminals that support DMRS reception.

[4] In each of the above embodiments, when an RACH response message is transmitted by DMRS transmission, for example, one particular antenna port (for example, antenna port 7) may be used or a plurality of antenna ports may be used (for example, transmission diversity may be employed). Also, an antenna port to be used may be indicated (or broadcasted) to a terminal.

[5] A first resource group and a second resource group for RACH preambles may be used differently as follows.

(1) At the time of transmission of an RACH preamble for transition from an idle state to a connected state, the second resource group is used, and the first resource group is used for cases other than the above. Consequently, in the case of transition from an idle state, fair connection chances can be provided to users regardless of performance of terminals.

(2) A terminal that can receive an RACH response via an extension carrier uses the first resource group. Consequently, a base station can transmit an RACH response to an extension carrier, enabling congestion of normal component carriers to be avoided.

(3) In CoMP, when a terminal is located in the vicinity of a transmission point (e.g., RRH (remote radio head)), the terminal uses the first resource group, and uses the second resource group in cases other than this case. The terminal determines whether or not the terminal is located in the vicinity of a transmission point, based on, e.g., results of measurement of received power of a CSI-RS from respective transmission points. Consequently, all RRHs including a macro base station transmits an RACH response by CRS transmission to terminals that are distant from a transmission point, and can transmit an RACH response by DMRS transmission only to terminals located in the vicinity of transmission points. As a result, a more robust and efficient operation can be achieved.

Furthermore, different RACH preamble resource candidate groups can be provided for respective transmission points. In this case, a terminal can inform the network of a transmission point in the vicinity of which the terminal is located. As a result, a base station can easily select a transmission point to be used for each terminal.

[6] In Embodiment 4, any of the following parameters can separately be set for a terminal that can receive an RACH response transmitted by DMRS transmission, in addition to window size.

(1) mac-ContentionResolutionTimer:
This parameter indicates time for waiting message 4 from transmission of message 3. For Rel. 11, short time is set in a timer because there are many resources that can be used for message 4.

(2) maxHARQ-Msg 3 Tx:
This parameter indicates a maximum message 3 retransmission count (1 to 8). Since RACH preamble resources for DMRS are used by terminals in the vicinity of RRHs, a small retransmission count is set for the RACH preamble resources.

(3) powerRampingStep:

The parameter indicates a power increase amount (0, 2, 4 or 6 dB) for every RACH preamble retransmission. Since RACH resources for DMRS are used by terminals in the vicinity of RRHs, interference with other cells is small. Thus, in order for a base station to receive an RACH preamble earlier, a large increment is set.

(4) preambleInitialReceivedTargetPower:

This parameter indicates a target value of received power of an RACH preamble (−120 to −90 dBm). Since RACH resources for DMRS are used by terminals in the vicinity of RRHs, interference with other cells is small. Thus, in order for a base station to receive an RACH preamble earlier, a high target value is set.

(5) preamble TransMax:

This parameter indicates a maximum RACH preamble retransmission count (3 to 200). Since a DMRS is used in an MBSFN subframe or an extension carrier, there are many resources for RACH responses for DMRS. Thus, since there is no problem even if RACH preambles are frequently transmitted, a large maximum retransmission count is set.

[7] In each of the above embodiments, different RA-RNTIs may be used for terminals that can receive an RACH response transmitted by DMRS transmission and terminals other than such terminals. Also, different E-PDCCHs may be used for terminals that can receive an RACH response transmitted by DMRS transmission and terminals other than such terminals. Consequently, it is possible to differentiate between PDCCHs for assigning a PDSCH, via which an RACH response message is transmitted, for the terminals that can receive an RACH response transmitted by DMRS transmission and terminals other than such terminals.

[8] Although in Embodiment 1, in terminal 200, the RACH preamble resources having RACH preamble resource numbers of NcX+1 to NcY is interpreted as the first RACH preamble resource candidate group, the RACH preamble resources having RACH preamble resource numbers of 1 to NcX may be interpreted as the first RACH preamble resource candidate group. In this case, different selection probabilities may be set for the RACH preamble resources of NcX+1 to NcY and the RACH preamble resource of 1 to NcX so as to select resources of NcX+1 to NcY that can be selected by terminal 200, with a high probability.

Also, in the case where a terminal is an RRC connected state (or an active state) such as at the time of handover, base station 100 can explicitly specify an RACH preamble resource, and in this case, an RS to be used for RACH response transmission can be changed depending on which RACH preamble resource base station 100 specifies from among the RACH preamble resources of 1 to NcX and the resources of NcX+1 to NcY. For example, in the case where there are many terminals compliant with Rel. 8 to Rel. 10, resources of 1 to NcX are specified and an RACH response is transmitted by CRS transmission, whereby a plurality of RACH responses for a plurality of terminals are collectively transmitted. Alternatively, in a CoMP operation using a same cell ID, the resources of NcX+1 to NcY are specified for a terminal located in the vicinity of a particular transmission point and an RACH response can be transmitted by DMRS transmission only via the particular transmission point.

Figure 13:
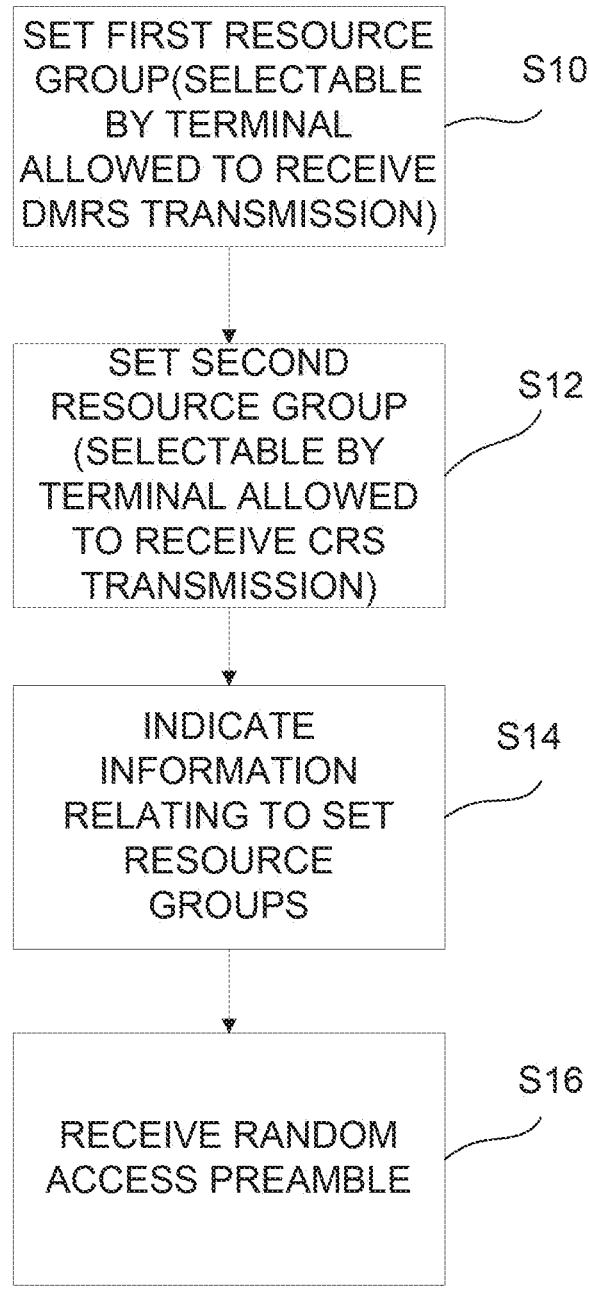
FIG. 13 is a flow diagram.

FIG. 13 is a flow diagram of a radio communication method. The radio communication method comprises: setting a first resource candidate group selectable by a first terminal allowed to receive a random access response transmitted by a demodulation reference signal (DMRS)-used data transmission (S 10); setting a second resource candidate group selectable by a second terminal allowed to receive the random access response transmitted by a cell specific reference signal (CRS)-used data transmission (S 12); indicating, to the first terminal and the second terminal, information relating to the set first resource candidate group and the set second resource candidate group using a control signal (S 14); and receiving, from the first terminal and the second terminal, a random access preamble using one of the first resource candidate group and the second resource candidate group (S 16), wherein when the received random access preamble is included in the first resource candidate group, the random access response is transmitted using a control channel in which the DMRS is transmitted; and when the received random access preamble is included in the second resource candidate group, the random access response is transmitted using a control channel in which the CRS is transmitted.

Figure 14:
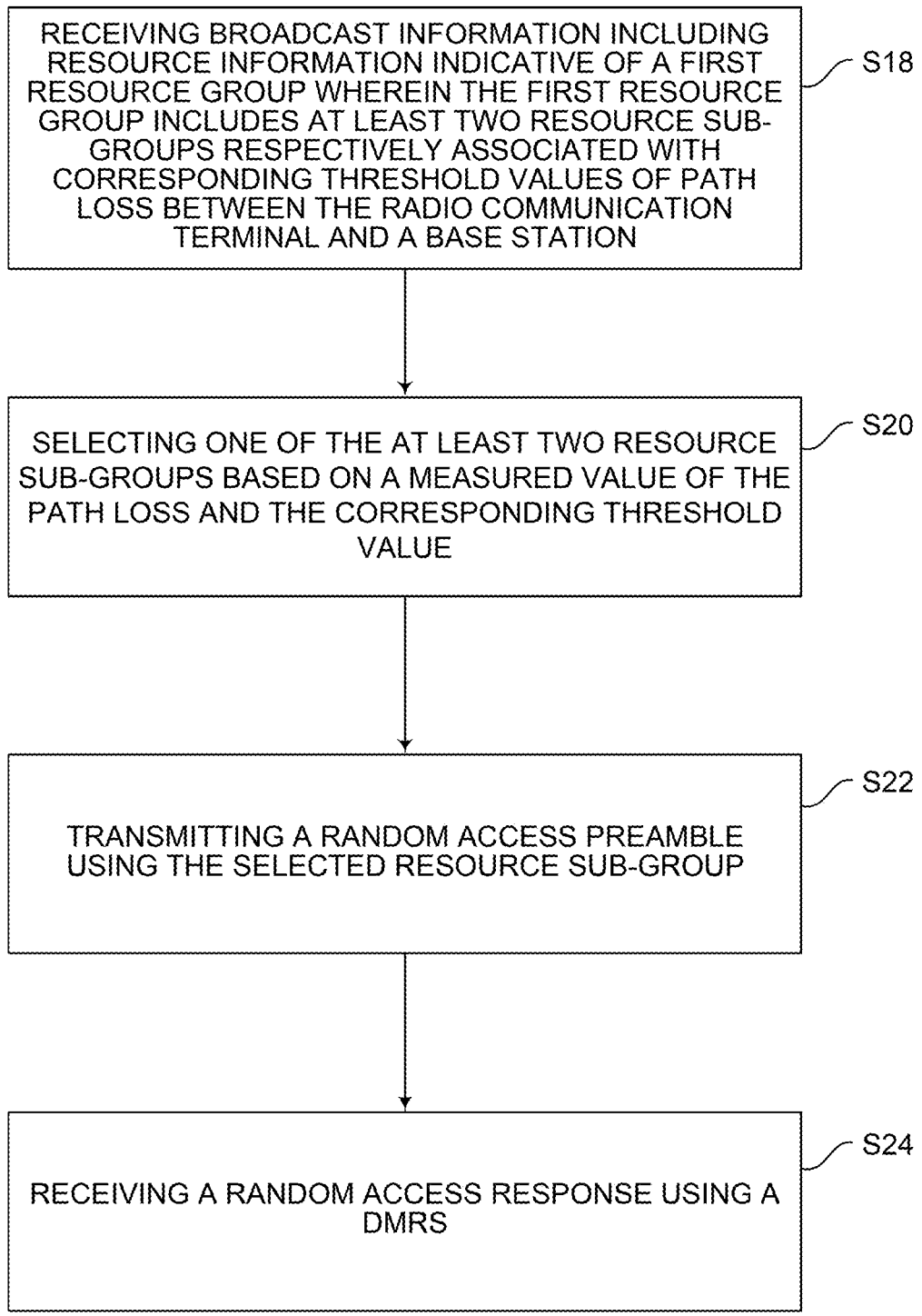
FIG. 14 is a flow diagram.

FIG. 14 is a flow diagram of a radio communication method. The radio communication method comprises: receiving broadcast information including resource information indicative of a first resource group wherein the first resource group includes at least two resource sub-groups respectively associated with corresponding threshold values of path loss between the radio communication terminal and a base station (S18), selecting one of the at least two resource sub-groups based on a measured value of the path loss and the corresponding threshold value (S20), transmitting a random access preamble using the selected resource sub-group (S22), and receiving a random access response using a Demodulation Reference Signal (DMRS) (S24).

[9] In the above embodiments, an extension carrier may be called a new carrier type. Also, an extension carrier has no downlink control channel transmission region, and may be prescribed as a carrier via which none of a PDCCH, a PHICH (physical hybrid-ARQ indicator channel: downlink ACK/NACK channel) and a PCFICH (physical control format indicator channel) is transmitted.

[10] In the foregoing embodiments, the present disclosure is configured with hardware by way of example, but the disclosure may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosure of the specification, the drawings, and the abstract included in Japanese Patent Application No. 2011-171945, filed on Aug. 5, 2011, is incorporated herein by reference in its entirety.

INDUSTRIAL APPLICABILITY

A transmission apparatus, a preamble transmission apparatus and a transmission method according to the present disclosure are useful in that they enable efficient transmission of a response signal for a random access preamble transmitted from a preamble transmission apparatus.

REFERENCE SIGNS LIST 100, 400 base station
101, 401 setting section
102, 201, 402, 501 reception section
103, 202, 403, 502 control section
104, 203, 404, 503 transmission section
200, 300, 500 terminal

The invention claimed is:

1. A radio communication method comprising:
receiving, by a first terminal which supports a random access response reception using a Demodulation Reference Signal (DMRS), broadcast information including resource information indicative of a first resource group;
wherein parameters indicating ra-ResponseWindowSize are set for the first terminal separately from those of a second terminal which does not support the random access response reception using a DMRS;
wherein parameters indicating a maximum RACH (random access channel) preamble retransmission count are set for the first terminal and separately from those of the second terminal;
wherein, the first resource group includes at least two resource sub-groups respectively associated with corresponding threshold values of received power measured at the first and second terminals;
transmitting, from the first terminal, a random access preamble using the first resource group; and
receiving, by the first terminal, a random access response using the DMRS.

2. The radio communication method according to claim 1, comprising:
receiving, by the first terminal, a Physical Downlink Control Channel (PDCCH) including assignment information indicative of a downlink resource in which the random access response is mapped.

3. The radio communication method according to claim 1, wherein, time setting for retransmission of the first terminal is shorter than time setting for retransmission of the second terminal.

4. The radio communication method according to claim 1, wherein, parameters indicating a mac-ContentionResolutionTimer of a RACH response are set for the first terminal and the second terminal.

5. A first radio communication terminal comprising:
reception circuitry, which, in operation, supports a random access response reception using a Demodulation Reference Signal (DMRS), and receives broadcast information including resource information indicative of a first resource group;
wherein parameters indicating ra-ResponseWindowSize are set for the first terminal separately from those of a second terminal which does not support the random access response reception using a DMRS;
wherein parameters indicating a maximum RACH (random access channel) preamble retransmission count are set for the first terminal separately from those of the second terminal;
wherein, the first resource group includes at least two resource sub-groups respectively associated with corresponding threshold values of received power measured at the first and second terminal;
transmission circuitry; and
control circuitry, which is coupled to the reception circuitry and the transmission circuitry and which, in operation, performs:
controlling the transmission circuitry to transmit a random access preamble using the first resource group; and
controlling the reception circuitry to receive a random access response using the DMRS.

6. The first radio communication terminal according to claim 5, wherein, the reception circuitry, in operation, receives a Physical Downlink Control Channel (PDCCH) including assignment information indicative of a downlink resource in which the random access response is mapped.

7. The first radio communication terminal according to claim 5, wherein, time setting for retransmission of the first terminal is shorter than time setting for retransmission of the second terminal.

8. The first radio communication terminal according to claim 5, wherein, parameters indicating a mac-ContentionResolutionTimer of a RACH response are set for the first terminal and the second terminal.

* * * * *